United States Patent
Bauer et al.

(10) Patent No.: US 11,321,873 B1
(45) Date of Patent: May 3, 2022

(54) CALIBRATING AND DETECTING VIBRATION OF STEREO RANGING SYSTEMS

(71) Applicant: Amazon Technologies, Inc., Seattle, WA (US)

(72) Inventors: Joachim Bauer, Graz (AT); Gabor Szedo Becker, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 213 days.

(21) Appl. No.: 16/267,019

(22) Filed: Feb. 4, 2019

(51) Int. Cl.
| | |
|---|---|
| *G06T 7/80* | (2017.01) |
| *G06T 7/521* | (2017.01) |
| *G06T 7/593* | (2017.01) |
| *B64C 39/02* | (2006.01) |
| *H04N 13/246* | (2018.01) |

(52) U.S. Cl.
CPC .............. *G06T 7/85* (2017.01); *B64C 39/024* (2013.01); *G06T 7/521* (2017.01); *G06T 7/593* (2017.01); *H04N 13/246* (2018.05); *B64C 2201/042* (2013.01); *B64C 2201/123* (2013.01); *B64C 2201/127* (2013.01); *B64C 2201/16* (2013.01); *G06T 2207/10012* (2013.01); *G06T 2207/10028* (2013.01)

(58) Field of Classification Search
CPC ... G06K 9/00201; G01S 17/931; G05D 1/042
See application file for complete search history.

(56) References Cited

U.S. PATENT DOCUMENTS

| | | | | |
|---|---|---|---|---|
| 7,196,776 | B2* | 3/2007 | Ohtomo | G01C 15/002 356/4.01 |
| 9,683,943 | B2* | 6/2017 | Ando | G01N 21/8851 |
| 2005/0094879 | A1* | 5/2005 | Harville | G06K 9/00201 382/209 |
| 2018/0188361 | A1* | 7/2018 | Berger | G01S 17/931 |
| 2019/0094347 | A1* | 3/2019 | Singh | G01S 17/931 |
| 2019/0182415 | A1* | 6/2019 | Sivan | G06F 3/013 |
| 2019/0187724 | A1* | 6/2019 | Li | G05D 1/042 |
| 2020/0180791 | A1* | 6/2020 | Kimberly | B64F 5/60 |

* cited by examiner

*Primary Examiner* — Joshua L Schwartz
(74) *Attorney, Agent, or Firm* — Athorus, PLLC

(57) ABSTRACT

Stereo ranging systems having pairs of imaging devices may be calibrated by projecting beams of light into the fields of view of the imaging devices and comparing the appearances of reflections of the beams depicted within images captured thereby. Where the reflections appear consistently within the images, the stereo ranging systems may be determined to be calibrated and operating properly. Where the reflections do not appear consistently within the images, the stereo ranging systems may be determined to be not calibrated or not operating properly. The light sources may be light-emitting structures such as diodes or reflective objects. A vector generated based on inconsistencies in appearances of reflections within images may be used to adjust the images. Images adjusted based on such vectors may be used to determine ranges to objects depicted therein or for any other purpose.

20 Claims, 19 Drawing Sheets

MOTION OF
IMAGING DEVICES

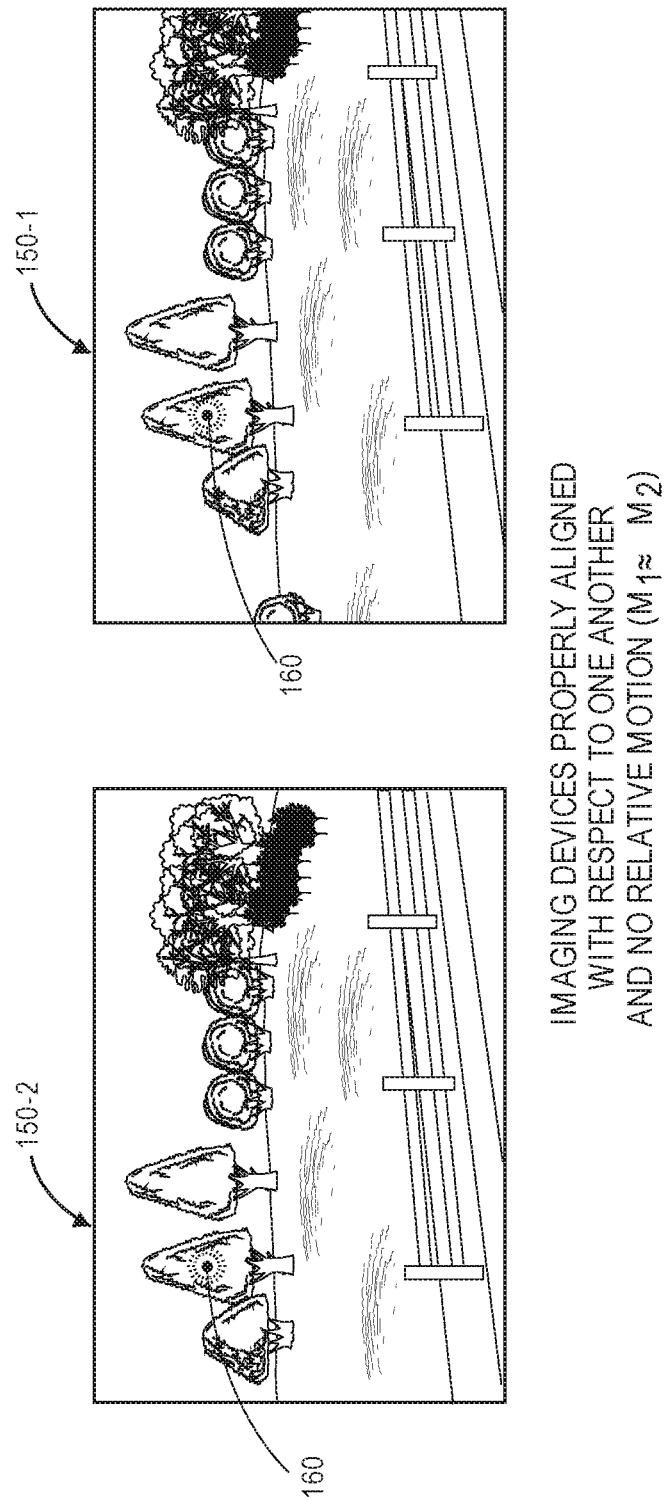

OUT OF FOCUS: REFLECTIONS HAVE DIFFERENT SIZES

CALIBRATION CHECK: REFLECTIONS NOT IN CALIBRATED POSITION

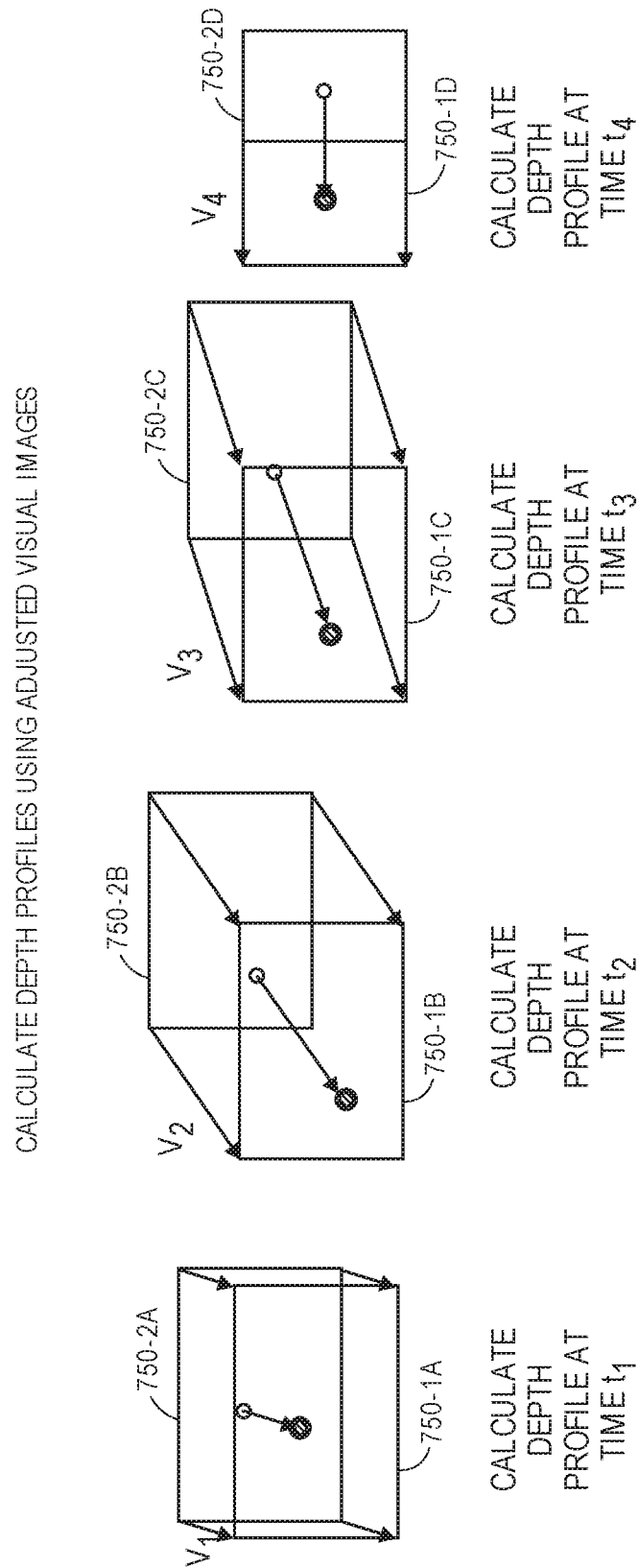

CALIBRATING AND DETECTING VIBRATION OF STEREO RANGING SYSTEMS

BACKGROUND

Aerial vehicles (including, specifically, unmanned aerial vehicles, or UAVs) are frequently equipped with one or more imaging devices such as digital cameras which may be used to aid in the guided or autonomous operation of an aerial vehicle, to determine when the aerial vehicle has arrived at or passed over a given location, or is within range of one or more structures, features, objects or humans (or other animals), to conduct monitoring operations, or for any other purpose. Outfitting an aerial vehicle with one or more imaging devices typically requires installing housings, turrets or other structures or features by which the imaging devices may be mounted to the aerial vehicle. Such structures or features add weight to the aerial vehicle, and may increase the amount or extent of drag encountered during flight, thereby exacting an operational cost from the aerial vehicle in exchange for the many benefits that imaging devices may provide.

Stereo ranging (or stereo triangulation) is a process by which distances or ranges to objects may be determined from digital images depicting such objects that are captured using imaging devices, such as digital cameras, that are separated by a fixed distance. For example, by processing pairs of images of an environment that are captured by imaging devices, ranges to points expressed in both of the images (including but not limited to points associated with specific objects) may be determined by finding a virtual intersection of pairs of lines extending from the respective lenses or sensors of the imaging devices through representations of such points within each of the images. If each of the images of the environment is captured substantially simultaneously, or if conditions of the environment are substantially unchanged when each of the images is captured, a range to a single point within the environment at a given time may be determined based on a baseline distance between the lenses or sensors of the imaging devices that captured such images and a disparity, or a distance between corresponding representations of a single point in space expressed within both of the images when the images are superimposed upon one another. Such processes may be completed for any number of points in three-dimensional space that are expressed in both of the images, and a model of such points, e.g., a point cloud, a depth map or a depth model, may be defined accordingly. The model of such points may be updated as pairs of images are subsequently captured and processed to determine ranges to such points.

As with other imaging systems, stereo ranging systems necessarily depend on a proper calibration in order to operate effectively. Because imaging devices of stereo ranging systems must be rigidly aligned in pairs, some modes of vibration may lead to severe image quality degradation. For example, where the imaging devices of a pair are not aligned in parallel and vibrating synchronously, depths or ranges determined from the imaging devices are ineffective or useless.

BRIEF DESCRIPTION OF THE DRAWINGS

FIGS. 1A through 1D are views of aspects of one system for calibrating or detecting vibration in stereo ranging systems in accordance with embodiments of the present disclosure.

FIGS. 7A through 7E are views of aspects of one system for calibrating or detecting vibration in stereo ranging systems in accordance with embodiments of the present disclosure.

DETAILED DESCRIPTION

As is set forth in greater detail below, the present disclosure is directed to calibrating stereo ranging systems, or detecting vibration in stereo ranging systems. More specifically, the systems and methods disclosed herein are directed to configuring a pair of imaging devices (e.g., digital cameras) to capture imaging data for determining stereo distance information, or to detect asynchronous vibration among the imaging devices of the pair, by projecting light from one or more surfaces and detecting differences in positions or patterns of reflections of the projected light depicted within imaging data captured by the imaging devices. A stereo rig outfitted with a pair of imaging devices may be augmented by a light source aligned substantially parallel to the axes of orientation of the imaging devices and configured to project the light upon surfaces within their respective fields of view. The imaging devices may be digital cameras (e.g., black-and-white, grayscale or color cameras) or any other devices for capturing and interpreting light that is reflected from one or more objects. In some embodiments, the light source may be a light-emitting diode or laser diode integrated with the stereo rig that is configured to project one or more points of light upon such surfaces. In some embodiments, the light source may be a reflective object that is integrated with, or temporarily or releasably applied to, the stereo rig and configured to reflect light upon such surfaces.

Where a reflection of a point of light appears within the same size and location on surfaces depicted within imaging data captured by the imaging devices of a stereo ranging system, the stereo ranging system is determined to be calibrated and properly operational. Where the reflections of points of light appear in different sizes or locations on such surfaces, e.g., at varying degrees of separation or in moving patterns, within imaging data captured by the imaging devices of the stereo ranging system, the stereo ranging system is determined to require calibration or not be properly operational. In such instances, one or both of the imaging devices may require maintenance or repairs. Alternatively, in such instances, imaging data captured using such imaging devices may be manipulated or altered based on one or more vectors that are representative of differences or distances between the reflections of the points of light within the imaging data captured using the respective imaging devices.

Figure 1A:
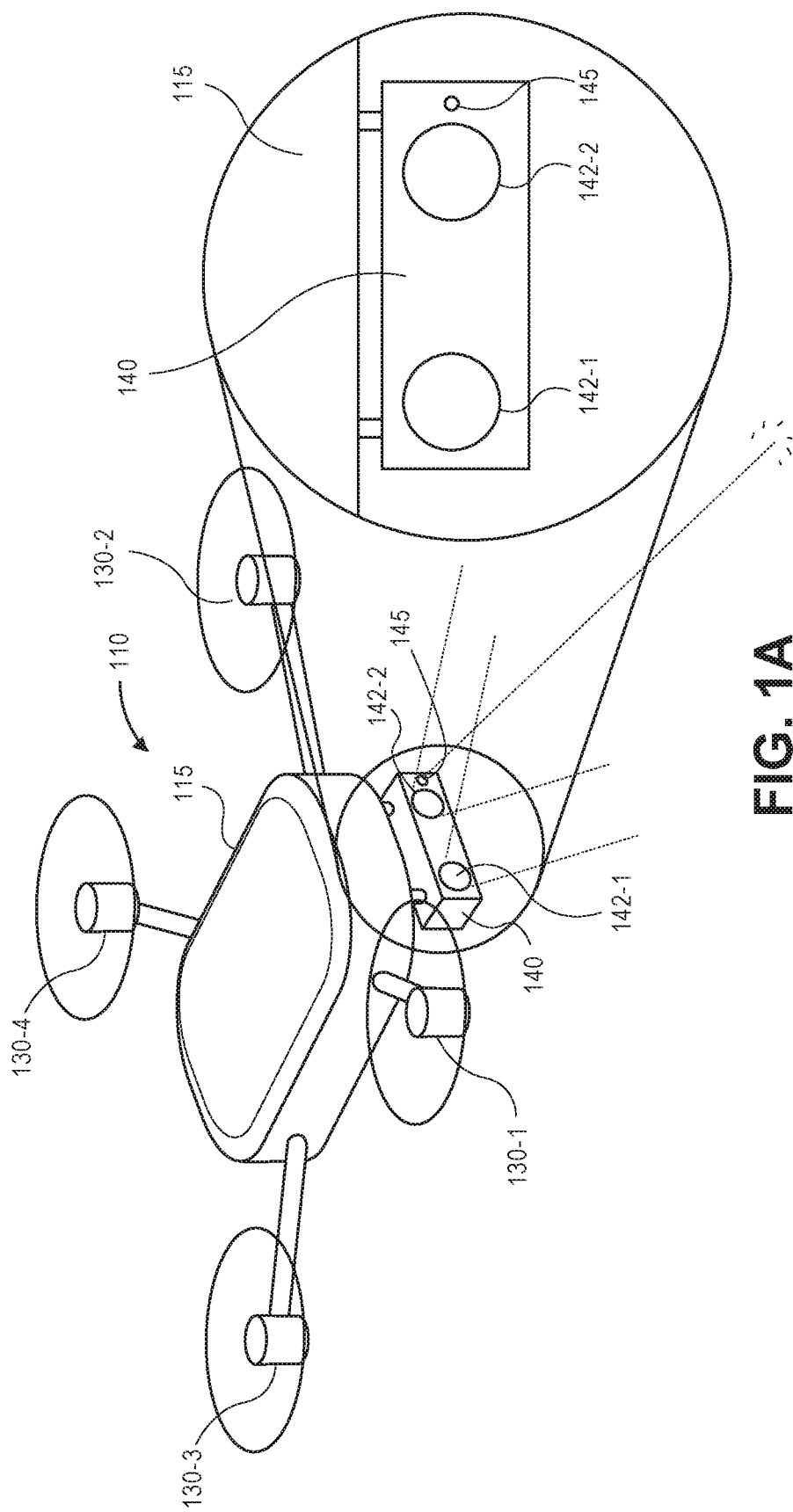

Referring to FIGS. 1A through 1D, a system for calibrating or detecting vibration in stereo ranging systems in accordance with embodiments of the present disclosure is shown. As is shown in FIG. 1A, an aerial vehicle 110 includes a frame 115, a plurality of motors 130-1, 130-2, 130-3, 130-4 and a stereo rig (or a "3D rig") 140. Each of the plurality of motors 130-1, 130-2, 130-3, 130-4 is mounted to the frame 115 and includes one or more propellers rotatably coupled to one of the motors 130-1, 130-2, 130-3, 130-4. The stereo rig 140 is also mounted to the frame 115, and includes a pair of imaging devices 142-1, 142-2 and a laser transmitter 145 disposed within a common frame or housing. As is shown in FIG. 1A, the imaging devices 142-1, 142-2 are aligned with axes or orientation or fields of view extending forward of the aerial vehicle 110. The laser transmitter 145 is aligned to project one or more beams of light at any wavelength or frequency, e.g., within or outside of the visible spectrum, forward of the aerial vehicle 110 and into the fields of view of the imaging devices 142-1, 142-2, where the beams of light may come into contact with one or more foreground or background objects.

Figure 1B:
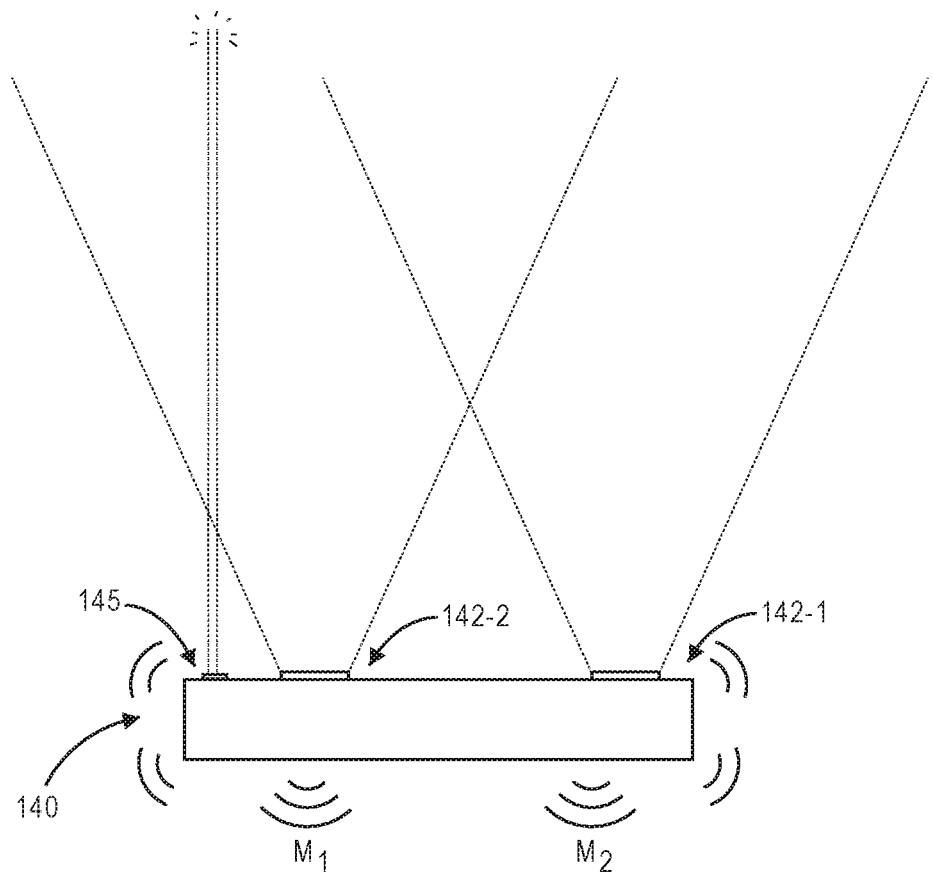

As is shown in FIG. 1B, each of the imaging devices 142-1, 142-2 has a field of view having an axis of orientation extending substantially normal to an outer surface of the stereo rig 140. The laser transmitter 145 is also configured to project light in a direction substantially normal to the stereo rig 140. In some embodiments, the laser transmitter 145 may be a light-emitting diode (or "LED"), a laser diode or other projecting light source that can project light in a modulated signal or other form onto one or more surfaces, in a well-defined pattern that is easily detectable. In some embodiments, the light may be projected by the laser transmitter 145 in the form of a dot, a circle, a square, or any other patterns or collections of points having visible cross-sections. For example, the laser transmitter 145 may be a low-power illuminating device configured to project one or more beams of light within the visible spectrum, at any wavelengths or frequencies. Alternatively, in lieu of or along with the laser transmitter 145, the stereo rig 140 may include one or more reflectors that are configured to reflect light in one or more directions toward the fields of the view of the imaging devices 142-1, 142-2.

As is shown in FIG. 1A, the laser transmitter 145 is mounted outboard of the imaging device 142-2, e.g., on an opposite side of the imaging device 142-2 from the imaging device 142-1, in close proximity to the imaging device 142-2. In some embodiments, the laser transmitter 145 is mounted in close proximity to one of the imaging devices 142-1, 142-2, in order to more closely mimic vibration, shocks or other motion affecting the one of the imaging devices 142-1, 142-2. For example, as is shown in FIG. 1A, a distance between the laser transmitter 145 and the imaging device 142-2 is less than a distance between the imaging device 142-1 and the imaging device 142-2.

As is shown in FIG. 1B, when the aerial vehicle 110 is engaged in airborne operations, the stereo rig 140 may be subject to vibrations, shocks or other motion, thereby subjecting each of the imaging devices 142-1, 142-2 to motion $M_1$, $M_2$. In order to adequately perform stereo ranging operations, the imaging devices 142-1, 142-2 must remain in a constant geometric relationship with respect to one another, such that each of the imaging devices 142-1, 142-2 is subject to the same vibrations, shocks or other motion, and there is no relative motion or vibration between the imaging devices 142-1, 142-2 during the stereo ranging operations. Where the relationship between the imaging devices 142-1, 142-2 is rigidly fixed, images captured using the imaging devices 142-1, 142-2 may be used to perform stereo ranging operations despite such vibrations, shocks or other motion, which affect each of the imaging devices 142-1, 142-2 in a consistent manner. In the event that such vibrations, shocks or other motion result in a bending, twisting or other adverse effects, or otherwise affect the relationship between the imaging devices 142-1, 142-2, or otherwise result in relative motion or vibration between the imaging devices 142-1, 142-2, images captured by the imaging devices 142-1, 142-2, or depths or ranges determined based on such images, will be inaccurate.

As is shown in FIG. 1C, where the imaging devices 142-1, 142-2 are properly aligned with respect to one another, and with no relative motion or vibration between them, such that the motion $M_1$ of the imaging device 142-1 is substantially the same as the motion $M_2$ of the imaging device 142-2, a reflection 160 of light projected upon a scene by the laser transmitter 145 will appear in the same manner in images 150-1, 150-2 captured using the imaging devices 142-1, 142-2. In such instances, where there exists no relative motion or vibration between the imaging devices 142-1, 142-2, the reflections 160 are the same size and consistently located, e.g., in fixed and constant positions on the same surfaces within the fields of view, and images captured using the imaging devices 142-1, 142-2, such as the images 150-1, 150-2, may be used to accurately determine ranges to objects appearing within each of their respective fields of view by one or more stereo ranging techniques.

Figure 1D:
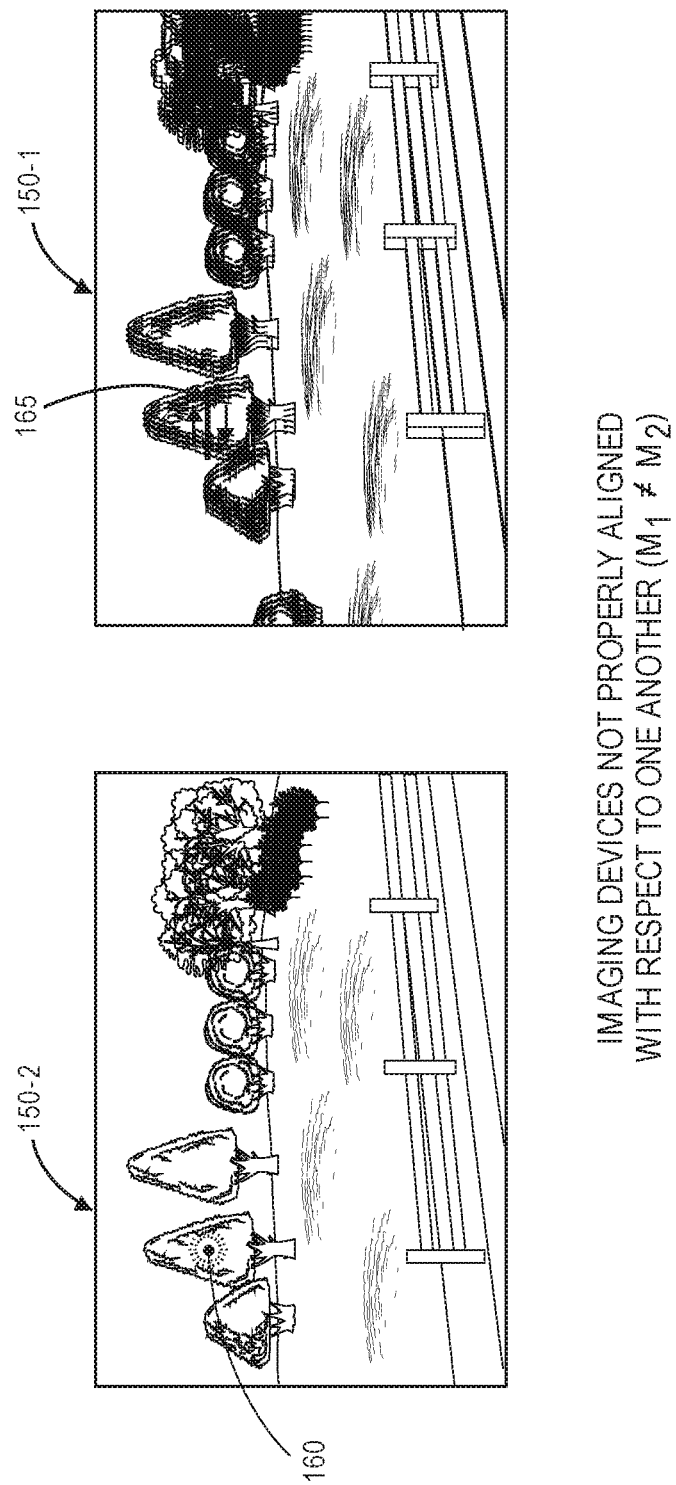

As is shown in FIG. 1D, where the imaging devices 142-1, 142-2 are not properly aligned with respect to one another, or have relative motion between them for any reason, such that the motion $M_1$ of the imaging device 142-1 is not the same as the motion $M_2$ of the imaging device 142-2, reflections of the light projected upon the scene by the laser transmitter will appear differently in the images 150-1, 150-2 captured using the imaging devices 142-1, 142-2. In particular, due to the relative motion or vibration between the imaging devices 142-1, 142-2, a reflection 160 of the light projected upon the scene by the laser transmitter 145 may appear as a dot in the image 150-2 captured using the imaging device 142-2, which is adjacent to or proximate the laser transmitter 145. A reflection 165 of the light projected upon the scene by the laser transmitter 145 may appear within the image 150-1 captured using the imaging device 142-1 as a line segment, such as is shown in FIG. 1D, or, alternatively, as a curvilinear line, a pattern or another shape. Upon detecting the reflection 165 within the image 150-1, and upon determining that the reflection 165 is inconsistent with the reflection 160 depicted within the image 150-2, it may be determined that the stereo ranging system is not properly calibrated, or that one or both of the imaging devices 150-1, 150-2 requires maintenance or repairs before a depth profile or one or more ranges to surfaces may be accurately determined using visual images captured thereby.

Accordingly, by projecting light upon a scene, and determining differences by which the light appears within images captured using imaging devices of a stereo ranging system, the stereo ranging system may be calibrated or otherwise evaluated to determine whether any maintenance or repairs may be required. In some embodiments, the light may be projected on regular or intermittent bases by one or more intrinsic sources, such as light-emitting diodes, laser diodes, or other illuminators, or by one or more extrinsic sources via a reflector or other system. Furthermore, in some embodiments, based on differences between positions or appearances of reflections of the light in pairs of images that are captured simultaneously (or substantially simultaneously) using the imaging devices of a stereo ranging system, a relationship between the images may be modified or established to account for the relative motion or vibration between the imaging devices, and the pairs of images that are captured by the imaging devices may be co-aligned and subjected to one or more stereo ranging analyses, in order to determine ranges to any number of points that are expressed in both of the images. For example, ranges to a plurality of points within an environment that appear in each of the images may be combined to form a point cloud, a depth map or another representation of a three-dimensional profile of the environment.

In accordance with the present disclosure, images captured by imaging devices of a stereo rig mounted to an aerial vehicle or another vehicle (e.g., an automobile, or an autonomous ground vehicle or robot) may be used to determine stereo distance information according to any number of stereo ranging algorithms or techniques. Outputs from such algorithms or techniques may be generated or stored in any form, and used for any purpose. For example, in some embodiments, distances to objects or features in an environment determined according to stereo ranging algorithms or techniques may be aggregated into a depth map or profile, that identifies or represents nominal or average distances to such objects or features and tolerances associated with such distances. In some other embodiments, a point cloud or other three-dimensional representation of an environment may be generated and stored in one or more data files. The point cloud may represent positions of each of the points that appear in both of the images of a pair, with pixel-level resolution.

In accordance with the present disclosure, imaging devices may be mounted to an aerial vehicle (or another vehicle, such as an automobile or any other type of ground vehicle) in any manner, e.g., by a stereo rig, with fields of view or axes of orientation that are aligned normal to the aerial vehicle or stereo rig, or at any other angle or orientation. In some embodiments, the imaging devices may have adjustable fields of view or axes of orientation, e.g., by one or more actuated or motorized features for adjusting either a focal length or an angular orientation of the imaging device. Additionally, a light source may also be mounted in association with a pair of imaging devices, e.g., by coupling the light source to an aerial vehicle, a stereo rig or another surface in any manner. The light source is preferably mounted or otherwise provided in close proximity to one of the imaging devices of a pair, in order to mimic the vibrations, shocks or other motion experienced by the one of the imaging devices, and remotely from another of the imaging devices of the pair. Alternatively, the light source may be mounted or otherwise provided in any location with respect to the imaging devices of a pair, including but not limited to locations that are equidistant from such imaging devices.

In some embodiments, the light source may be integrated into a stereo rig, an aerial vehicle or another system along with the pair of imaging devices. In some other embodiments, the light source may be temporarily or releasably applied or associated with the imaging devices. Likewise, in some embodiments, the light source may include one or more intrinsic systems for generating and projecting light toward surfaces within fields of view of imaging devices of a stereo ranging system. In some other embodiments, however, the light source may be a reflector or other system for reflecting light generated by one or more extrinsic systems and projected thereon toward such surfaces.

Imaging data (e.g., visual imaging data or depth imaging data) may be captured using one or more imaging devices such as digital cameras. Such devices may generally operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, e.g., digital images, and store such data files in one or more onboard or accessible data stores (e.g., a hard drive or other like component), as well as one or more removable data stores (e.g., flash memory devices), or displayed on one or more broadcast or closed-circuit television networks, or over a computer network such as the Internet.

A digital image is a collection of pixels, typically arranged in an array, which defines an optically formed reproduction of one or more objects, backgrounds or other features of a scene and may be stored in a data file. In a visual image, each of the pixels represents or identifies a color or other light condition associated with a portion of such objects, backgrounds or features. For example, a black-and-white visual image includes a single bit for representing a light condition of the pixel in a binary fashion (e.g., either black or white), while a grayscale visual image may represent the light condition in multiple bits (e.g., two to eight bits for defining tones of gray in terms of percentages or shares of black-and-white), and a color visual image may include groups of bits corresponding to each of a plurality of base colors (e.g., red, green or blue), and the groups of bits may collectively represent a color associated with the pixel. A depth image is also a collection of pixels that defines an optically formed reproduction of one or more objects, backgrounds or other features of a scene, and may also be stored in a data file. Unlike the pixels of a visual image, however, each of the pixels of a depth image represents or identifies not a light condition or color of such objects, backgrounds or features, but a distance to objects, backgrounds or features. For example, a pixel of a depth image may represent a distance between a sensor of an imaging device that captured the depth image (e.g., a depth camera or range sensor) and the respective object, background or feature to which the pixel corresponds.

Imaging data files that are stored in one or more data stores may be printed onto paper, presented on one or more computer displays, or subjected to one or more analyses, such as to identify items expressed therein. Such data files may be stored in any number of formats, including but not limited to JPEG or JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), Quick-Time (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in a distance between the sensor and the lens (e.g., optical zoom lenses or digital zoom lenses), a change in a location of the imaging device, or a change in one or more of the angles defining an angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color national flag blue is expressed as #31314A. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Distances (or depths or ranges) to objects that are represented in a pair of stereo images captured by imaging devices (e.g., digital cameras) having fields of view that overlap, at least partially, may be determined according to one or more stereo ranging techniques. For each point of each object that appears in both of the images, lines extending from the respective lenses, lens modules or other sensors of the respective imaging devices through representations of the points of the objects in each of the images will virtually intersect at a location corresponding to the actual position of that point, in three-dimensional space. Through the use of traditional geometric principles and properties, e.g., the properties of similar triangles, as well as the known or knowable variables such as baseline distance or separation between the imaging devices, the disparity between the points within the respective images and the focal lengths of the respective imaging devices, coordinates of the intersecting point may be determined accordingly.

In order to determine stereo distance information from a pair of images, each surface point that is visible within a first one of the images must be identified in the second one of the images, and the geometric position of imaging devices that captured each of the images must be known. Representations of a common point within two stereo images are sometimes called epipoles, or a conjugate pair of such epipoles, and the disparity is defined as the distance between the conjugate pair of epipoles when the two images are superimposed.

Where a point in space appears in two images, e.g., as epipoles, a plane defined by the positions of the respective epipoles within the images and an actual position of the point in space is called an epipolar plane. The images may then be co-aligned based on their contents, e.g., along lines corresponding to intersections of the epipolar plane with the respective image planes, or their respective epipolar lines. After the images have been aligned based on their contents, an actual position of the object may be determined by triangulating lines extending from lenses, lens modules or other sensors of an imaging device through the representations of the points in the respective images within the imaging plane. An intersection of such lines corresponds to the actual position of the point, and a distance to the point may be determined accordingly based on this actual position. Stereo ranging algorithms and techniques may be used to determine ranges or distances to each of the points that appears in both of the images, and such ranges or distances may be used to define a point cloud, a depth map or another three-dimensional model of the environment in which the object is provided. The depth model may be stored in a data file (e.g., a depth image) or utilized for any purpose, including but not limited to navigation, guidance, or collision avoidance.

Stereo ranging algorithms and techniques thus require determining correspondences of the epipoles in each of the pair of images, with each of the epipoles corresponding to a common point in three-dimensional space. When a plurality of correspondences of epipoles are identified from each of a pair of images of a scene, disparities for each of the conjugate pairs of epipoles may be determined, and a map of such disparities that mimics a three-dimensional structure of the scene may be reconstructed accordingly if information regarding aspects of the scene, e.g., geometric parameters such as the baseline distance or separation, the focal lengths of the imaging devices and others, is known.

There are a number of computer-based stereo ranging algorithms and techniques for determining real-world positions of points expressed in pairs of images of scenes, and for generating depth maps, point clouds or other three-dimensional representations of such scenes based on such positions. Such algorithms or techniques may aid in the performance of calibration, correspondence and/or reconstruction functions. For example, the Open Source Computer Vision (or "OpenCV") library includes a number of computer-based algorithms or other programming functions that are directed to determining distances or ranges from pairs of images. Similarly, a number of other stereo ranging algorithms or techniques programmed in the MATLAB language are publicly available. Computer-based algorithms or techniques are available from a number of other sources, as well.

Figure 2:
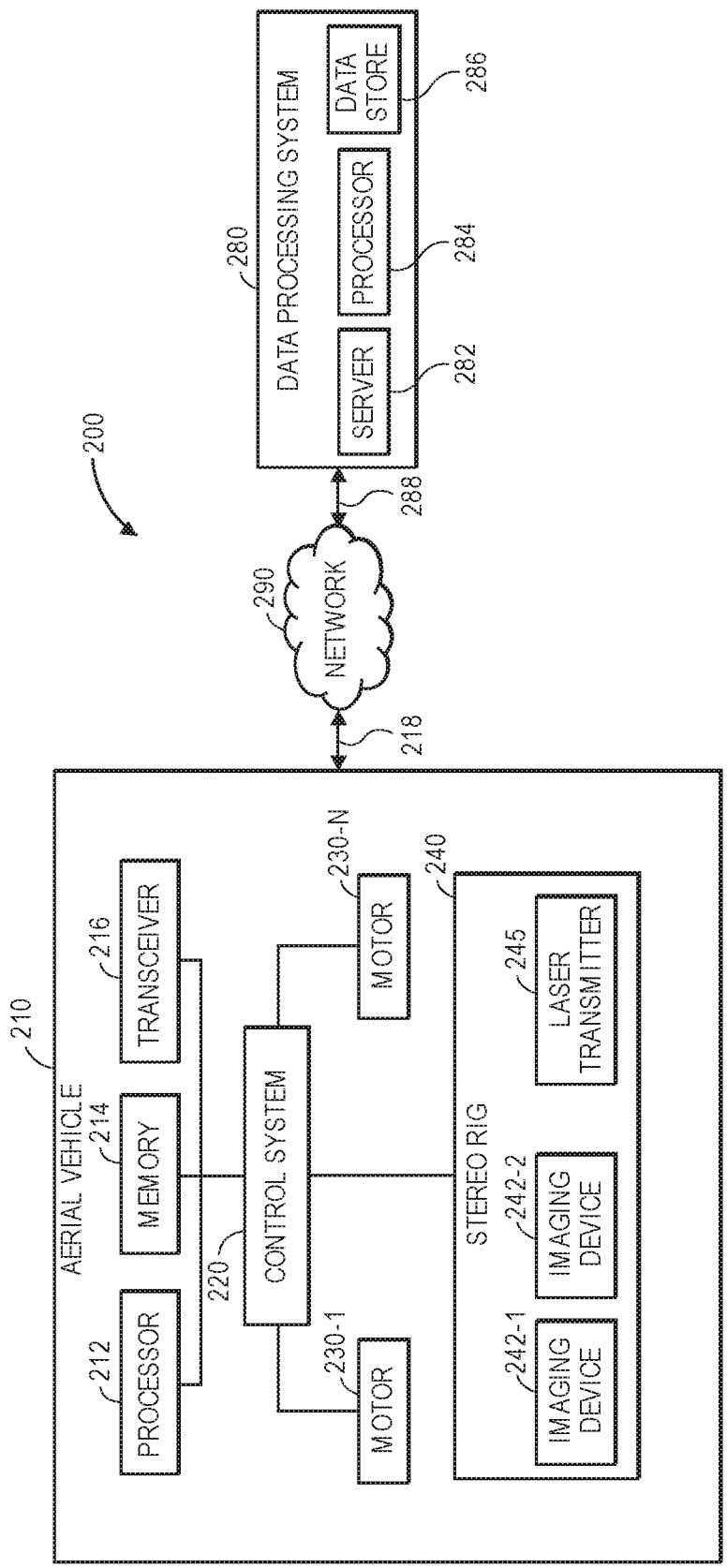
FIG. 2 is a block diagram of one system for calibrating or detecting vibration in stereo ranging systems in accordance with embodiments of the present disclosure.

Referring to FIG. 2, a block diagram of one system 200 for calibrating or detecting vibration in stereo ranging systems in accordance with embodiments of the present disclosure is shown. The system 200 of FIG. 2 includes an aerial vehicle 210 and a data processing system 280 connected to one another over a network 290, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1D.

The aerial vehicle 210 includes a processor 212, a memory 214 and a transceiver 216. The aerial vehicle 210 further includes a control system 220, a plurality of propulsion motors 230-1 . . . 230-n, and a stereo rig (or "3D rig") 240 having a plurality of imaging devices 242-1, 242-2 and a laser transmitter 245. Alternatively, in some embodiments, the aerial vehicle 210 may be any other type of vehicle, such as an automobile, an autonomous vehicle, or a robot, that includes one or more of the components or systems described herein including but not limited to the control system 220, the plurality of propulsion motors 230-1 . . . 230-n, the stereo rig 240, the imaging devices 242-1, 242-2 or the laser transmitter 245.

The processor 212 may be configured to perform any type or form of computing function, including but not limited to the execution of one or more stereo ranging algorithms or techniques. For example, the processor 212 may control any aspects of the operation of the aerial vehicle 210 and the one or more computer-based components thereon, including but not limited to the propulsion motors 230-1 . . . 230-n, the imaging devices 242-1, 242-2 and the laser transmitter 245. For example, the processor 212 may control the operation of one or more control systems or modules, such as the control system 220, for generating instructions for conducting operations of one or more of the propulsion motors 230-1 . . . 230-n, the imaging devices 242-1, 242-2 or the laser transmitter 245. Such control systems or modules may be associated with one or more other computing devices or machines, and may communicate with the data processing system 280 or one or more other computer devices (not shown) over the network 290, indicated by line 218, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor implementing any of a number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs. Alternatively, one or more of the functions disclosed herein as being performed by the processor 212, or by one or more other computer processors or processor units, may be performed using one or more integrated circuits (e.g., a field-programmable gate array), or any other electronic components, that may generate one or more independent values, or generate a comparison of two or more of such values, and need not include a processor or processor unit.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, flight paths, flight control parameters and/or other data items accessible by or to the processor 212. The memory 214 may be implemented using any suitable memory technology, such as static random access memory (SRAM), synchronous dynamic RAM (SDRAM), nonvolatile/Flash-type memory, or any other type of memory. In some embodiments, program instructions, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling the operation of the aerial vehicle 210 and for engaging with or releasing items, as desired. For example, the control system 220 may be configured to cause or control the operation of one or more of the propulsion motors 230-1 . . . 230-n, the imaging devices 242-1, 242-2 or the laser transmitter 245, such as to cause one or more of the propulsion motors 230-1 . . . 230-n to rotate propellers at a desired speed or to otherwise guide the aerial vehicle 210 along a determined or desired flight path, to cause one or more of the imaging devices 242-1, 242-2 to capture any imaging data (e.g., still or moving images) as well as any associated audio data and/or metadata, or to cause the laser transmitter 245 to project light at any wavelength or modulation frequency upon one or more objects within a scene. The control system 220 may further control other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The propulsion motors 230-1 . . . 230-n may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. For example, one or more of the propulsion motors 230-1 . . . 230-n may be a brushless direct current (DC) motor such as an outrunner brushless motor or an inrunner brushless motor.

The aerial vehicle 210 may include any number of such propulsion motors 230-1 . . . 230-n of any kind. For example, one or more of the propulsion motors 230-1 . . . 230-n may be aligned or configured to provide forces of lift to the aerial vehicle 210, exclusively, while one or more of the propulsion motors 230-1 . . . 230-n may be aligned or configured to provide forces of thrust to the aerial vehicle 210, exclusively. Alternatively, one or more of the propulsion motors 230-1 . . . 230-n may be aligned or configured to provide forces of lift and forces of thrust to the aerial vehicle 210, as needed. For example, the propulsion motors 230-1 . . . 230-n may be fixed in their orientation on the aerial vehicle 210, or configured to vary their respective orientations, e.g., a tilt-rotor aircraft. Moreover, the propulsion motors 230-1 . . . 230-n may be aligned or configured to operate with different capacities or ratings, or at different speeds, or coupled to propellers having different sizes and shapes. For example, the propulsion motors 230-1 . . . 230-n may be coupled to any rotors or rotatable systems having a plurality of shaped blades joined to a hub or boss, each of which may be rotatably mounted to a mast or shaft associated with a respective one of the propulsion motors 230-1 . . . 230-n and configured to generate forces of thrust when rotated within a fluid. Such propellers may include any number of blades, and may be fixed pitch, adjustable pitch or variable pitch in nature. Moreover, one or more of such propellers may be banded or shielded in any manner. In some embodiments, one or more of the propellers may be configured to rotate about a vertical axis, and to provide forces of thrust in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of thrust in directions corresponding to such axes accordingly.

The stereo rig 240 may be any device or structure that is configured for mounting the imaging devices 242-1, 242-2 at a fixed baseline distance and in parallel orientations with respect to one another. For example, the stereo rig 240 may be a frame, a housing or another structure formed with one or more faces or panels, and coupled to one or more surfaces of the aerial vehicle 210. In some embodiments, the lenses or sensors of the imaging devices 242-1, 242-2 may be mounted to or embedded within one or more of such faces or panels. In some embodiments, the laser transmitter 245 may be mounted to or embedded within the same frame or housing as the imaging devices 242-1, 242-2. In some other embodiments, the laser transmitter 245 may be provided in association with the imaging devices 242-1, 242-2, e.g., by coupling the laser transmitter 245 to one or more other surfaces of the aerial vehicle 210. Additionally, in some embodiments, the laser transmitter 245 is preferably mounted or otherwise provided in close proximity to one of the imaging devices 242-1, 242-2, in order to mimic the vibrations, shocks or other motion experienced by the one of the imaging devices 242-1, 242-2, and at a remote distance from another of the imaging devices 242-1, 242-2. Alternatively, the laser transmitter 245 may be mounted or otherwise provided in any location with respect to the imaging devices 242-1, 242-2, including but not limited to equidistant from such imaging devices 242-1, 242-2.

The imaging devices 242-1, 242-2 may be any form of optical recording devices, including but not limited to digital cameras, depth sensors or range cameras, infrared cameras, radiographic cameras or other optical sensors that may be used to photograph or otherwise record imaging data of structures, facilities, terrain or any other elements encountered during operation of the aerial vehicle 210, or for any other purpose. The imaging devices 242-1, 242-2 may be mounted to the stereo rig 240 or another common structural component, and may include one or more sensors, memory or storage components and processors, and such sensors, memory components or processors may further include one or more photosensitive surfaces, filters, chips, electrodes, clocks, boards, timers or any other relevant features (not shown). Such imaging devices 242-1, 242-2 may capture imaging data in the form of one or more still or moving images of any kind or form, as well as any relevant audio signals or other information during the operation of the aerial vehicle 210. Alternatively, the imaging devices 242-1, 242-2 may be mounted to any other system for which ranges or depths by stereo triangulation are desired, including but not limited to vehicles other than aerial vehicles, e.g., ground-based, sea-based or space-based vehicles.

The imaging devices 242-1, 242-2 may communicate with the processor 212 and/or the control system 220, or with one another, by way of a wired or wireless connection that may be dedicated or comprise all or part of an internal network (not shown). Additionally, the imaging devices 242-1, 242-2 may be adapted or otherwise configured to communicate with the data processing system 280 by way of the network 290. Although FIG. 2 includes a single box corresponding to a stereo rig having two imaging devices 242-1, 242-2 and one laser transmitter 245, those of ordinary skill in the pertinent arts will recognize that any number or type of stereo rigs, imaging devices and light sources, such as laser transmitters or reflectors, may be provided in accordance with the present disclosure.

In addition to the imaging devices 242-1, 242-2, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

The laser transmitter 245 may be any system that is configured to project light into fields of view of the imaging devices 242-1, 242-2, or upon one or more surfaces within the fields of view. For example, the laser transmitter 245 may be a light-emitting diode (or "LED"), a laser diode or other projecting light source that can project light in a modulated signal or other form onto one or more surfaces, in a well-defined pattern that is easily detectable, such as a dot, a circle, a square, or any other patterns or collections of points having visible cross-sections. For example, the laser transmitter 245 may be a low-power illuminating device configured to project a beam of light within the visible spectrum, with wavelengths in combinations of one or more of red (e.g., wavelengths between approximately six hundred twenty nanometers and seven hundred fifty nanometers, or 620-750 nm), yellow (e.g., wavelengths between five hundred seventy and five hundred ninety nanometers, or 520-570 nm) or blue (e.g., wavelengths between four hundred fifty and four hundred ninety-five nanometers, or 450-495 nm), or combinations of red, yellow or blue, such as orange, green or violet.

Alternatively, the stereo rig 240 may include any other type or form of light source for projecting light upon one or more surfaces within fields of view of the imaging devices 242-1, 242-2, and need not include a laser or diode. For example, the stereo rig 240 or the aerial vehicle 210 may include a powered or unpowered reflective device that is adapted to reflect light projected thereon into one or more beams that extend into the fields of view of the imaging devices 242-1, 242-2.

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing imaging data or other information or data received from the aerial vehicle 210 or, alternatively, provided in connection with one or more physical or virtual services configured to receive, analyze or store such imaging data or other information or data, as well as one or more other functions. The servers 282 may be connected to or otherwise communicate with the processors 284 and the data stores 286, which may store any type of information or data, including but not limited to acoustic signals, information or data relating to imaging data, or information or data regarding environmental conditions, operational characteristics, or positions, for any purpose. The servers 282 and/or the computer processors 284 may also connect to or otherwise communicate with the network 290, as indicated by line 288, through the sending and receiving of digital data. For example, the data processing system 280 may include any facilities, stations or locations having the ability or capacity to receive and store information or data, such as media files, in one or more data stores, e.g., media files received from the aerial vehicle 210, or from one another, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 280 may use any web-enabled or Internet applications or features, or any other client-server applications or features including any type of messaging techniques, to connect to the network 290, or to communicate with one another. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 280 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212 or the processor 284, or any other computers or control systems utilized by the aerial vehicle 210 or the data processing system 280 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
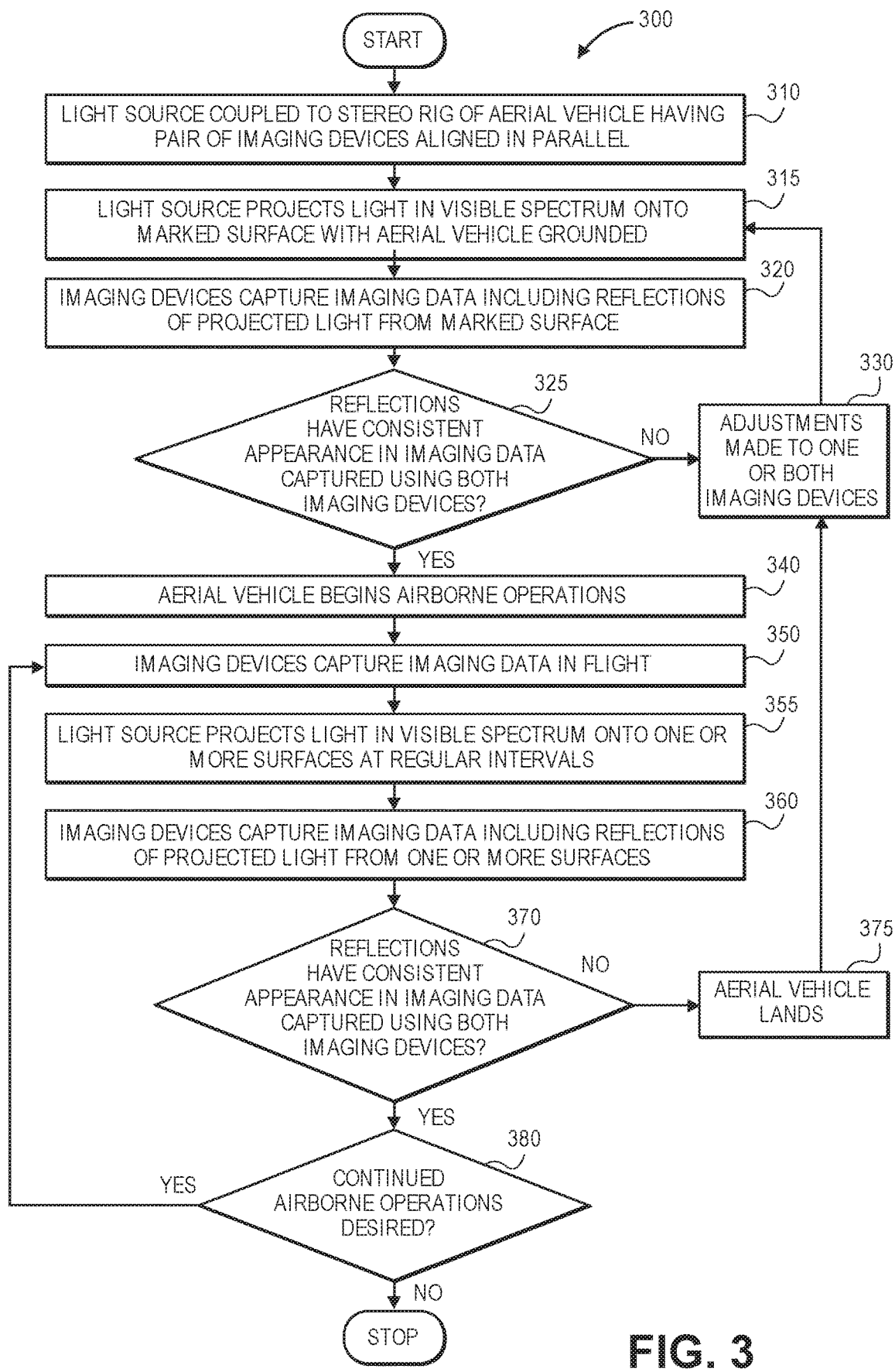
FIG. 3 is a flow chart of one process for calibrating or detecting vibration in stereo ranging systems in accordance with embodiments of the present disclosure.

As is discussed above, by projecting light onto fields of view of imaging devices of a stereo ranging system, the stereo ranging system may be calibrated, or asynchronous vibrations of the imaging devices may be detected, based on reflections of the light depicted within imaging data captured by the respective imaging devices. Referring to FIG. 3, a flow chart 300 of one process for calibrating or detecting vibration in stereo ranging systems in accordance with embodiments of the present disclosure is shown.

At box 310, a light source is coupled to a stereo rig of an aerial vehicle having a pair of imaging devices that are aligned in parallel. For example, the light source may be integrated into the stereo rig, such as is shown in FIGS. 1A and 1B, where the laser transmitter 145 is a component part of the stereo rig 140. Alternatively, the light source may be temporarily or releasably affixed to one or more surfaces of the stereo rig or the aerial vehicle, such as reflective object or surface. In some embodiments, the light source is mounted in close proximity to one of the two imaging devices of the pair, in order to more closely mimic vibration, shocks or other motion affecting the one of the imaging devices. The fields of view of the imaging device may extend vertically, horizontally, laterally or in any other direction with respect to the orientation of the aerial vehicle, and the light source may be configured to project light onto one or more surfaces within fields of view of each of the imaging devices. In some embodiments, the light source, the stereo rig and/or the imaging devices may be mounted to any other system for which ranges or depths by stereo triangulation are required, including but not limited to vehicles other than aerial vehicles, e.g., ground-based, sea-based or space-based vehicles.

At box 315, the light source projects light in a visible spectrum onto a marked surface with the aerial vehicle grounded. For example, with the aerial vehicle in a non-operating condition, such as with the one or more propulsion motors or other sources of motion or vibration secured, the light source may project one or more beams of light of any wavelength in a modulated signal or other form, in a well-defined pattern that is easily detectable. In some embodiments, the light may be projected by the light source in the form of a dot, a circle, a square, or any other patterns or collections of points having visible cross-sections, onto an opaque surface having a reticle, a crosshairs or other set of markings therein that enable visible reflections of the light to be physically or visually measured in a well-defined pattern that is easily detectable. In some embodiments, however, the surface need not have any markings.

At box 320, the imaging devices capture imaging data that includes reflections of the projected light from the marked surface. The imaging devices may be configured to capture color, grayscale, or black-and-white images, or any other type or form of imaging data.

At box 325, whether the reflections have a consistent appearance within the imaging data captured by both of the imaging devices is determined. For example, where a first one of the reflections appears larger or smaller than a second one of the reflections, as determined based on the marked surface, one or both of the imaging devices may require focusing or adjustment. Where a first one of the reflections appears in a different location than a second one of the reflections, one or both of the imaging devices may require calibration or another form of adjustment.

If the reflections do not have a consistent appearance within the imaging data captured by both of the imaging devices, then the process advances to box 330, where one or more adjustments are made to one or both of the imaging devices, before returning to box 315, where the light source projects light upon the marked surface, and to box 320, where the imaging devices capture reflections of the projected light from the marked surface.

If the reflections appear consistently within the imaging data captured by both of the imaging devices, then the process advances to box 340, where the aerial vehicle is cleared to begin airborne operations, and to box 350, where the imaging devices capture imaging data during flights of the aerial vehicle. For example, such imaging data may be used for any purpose, including but not limited to navigation, guidance, or collision avoidance.

At box 355, the light source projects light in the visible spectrum onto one or more surfaces at regular intervals or for any durations. The light may have the same characteristics as the light projected upon the marked surface in box 315, such as the same wavelengths, modulation frequencies or patterns, or different characteristics, such as different wavelengths, modulation frequencies or patterns. At box 360, the imaging devices capture imaging data that includes reflections of the projected light from the one or more surfaces in flight. The imaging data captured at box 360 may be used for any purpose, including one or more of the same purposes as the imaging data captured at box 350, e.g., navigation, guidance, or collision avoidance, or for one or more different purposes. For example, in some embodiments, the imaging data may be captured at box 360 for the express purpose of determining whether the imaging devices are properly calibrated with respect to one another, based on the reflections of the projected light depicted therein.

At box 370, whether the reflections have a consistent appearance in imaging data captured by both of the imaging devices is determined. For example, where the imaging devices are maintained in a rigid relationship and aligned in parallel, at a fixed baseline distance, the reflections should have the same size and shape in each of the sets of imaging data. If the imaging devices are not maintained in a rigid relationship, are not aligned in parallel, and are not aligned at a fixed baseline distance, the reflections in one or both of the sets of imaging data may be inconsistent with one another, and may take a form of a straight or curvilinear line or pattern in successive images captured using one or both of the imaging devices.

If the reflections do not appear consistently in the imaging data captured by both of the imaging devices, then the process advances to box 375, where the aerial vehicle lands, before returning to box 330, where one or more adjustments are made to one or both of the imaging devices, before returning to box 315, where the light source projects light upon the marked surface, and to box 320, where the imaging devices capture imaging data including reflections of the projected light from the marked surface. For example, where the reflections do not have a consistent appearance in each of the sets of imaging data, one or both of the imaging devices may require calibration or maintenance, and the systems and methods of the present disclosure may be used to ensure that the imaging devices are properly aligned with respect to one another following such calibration or maintenance. In some embodiments, the aerial vehicle may land in accordance with a predetermined schedule and at one or more scheduled destinations. Until the aerial vehicle lands, one or both of the imaging devices may continue to be operated to capture imaging data for any intended purpose. In some other embodiments, however, the aerial vehicle may land immediately or at an earliest opportunity.

If the reflections do have a consistent appearance within the imaging data, then the process advances to box 380, where whether continued airborne operations are desired. If continued airborne operations are desired, then the process returns to box 350, where the imaging devices continue to capture imaging data during flights of the aerial vehicle. If continued airborne operations are no longer desired, however, then the process ends.

Referring to FIGS. 4A through 4E, views of aspects of one system for calibrating or detecting vibration in stereo ranging systems in accordance with embodiments of the present disclosure are shown. Except where otherwise noted, reference numerals preceded by the number "4" shown in FIG. 4A through 4E indicate components or features that are similar to components or features having reference numerals preceded by the number "2" shown in FIG. 2 or by the number "1" shown in FIGS. 1A through 1D.

Figure 4A:
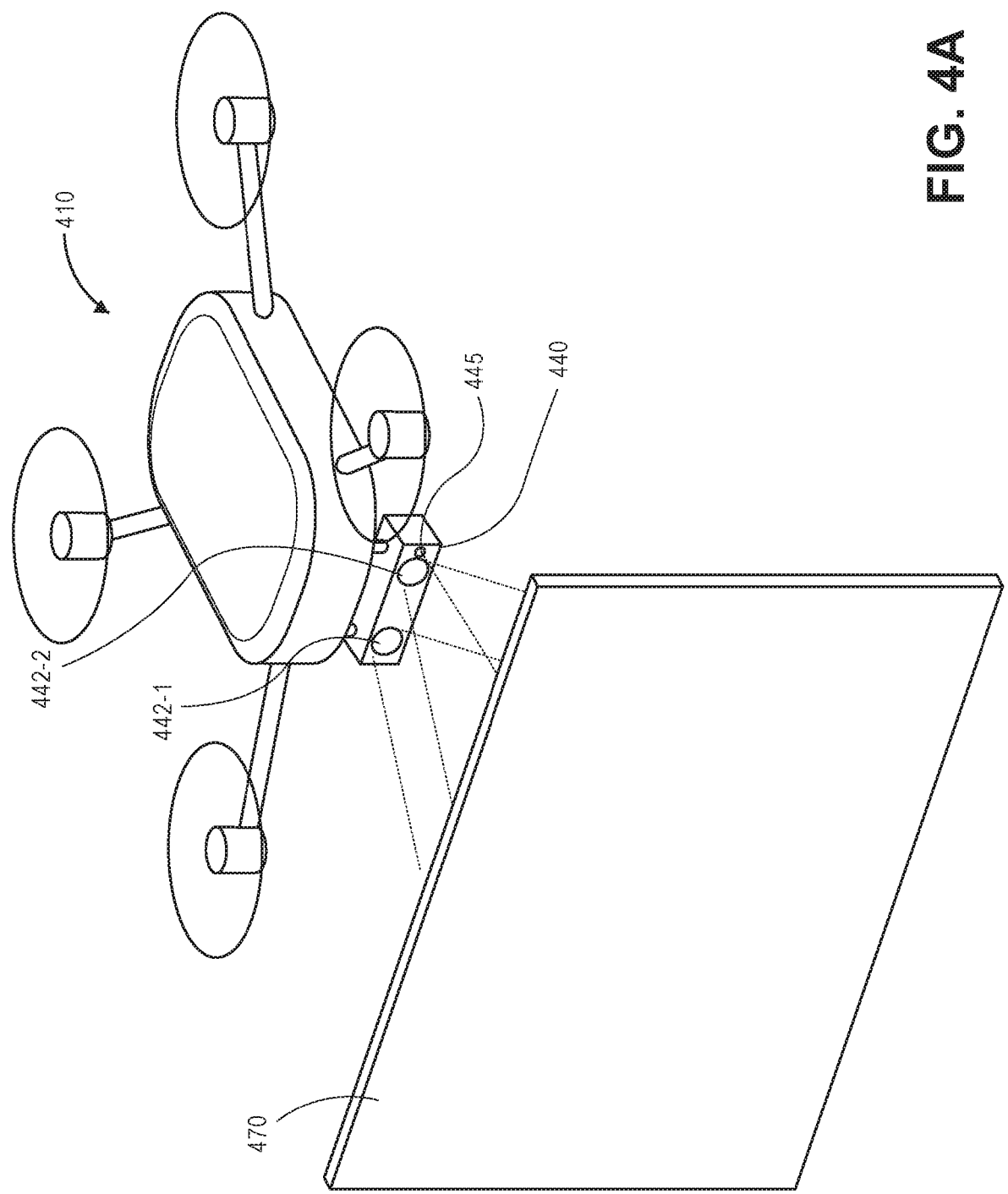
FIGS. 4A through 4E are views of aspects of one system for calibrating or detecting vibration in stereo ranging systems in accordance with embodiments of the present disclosure.
Figure 4B:
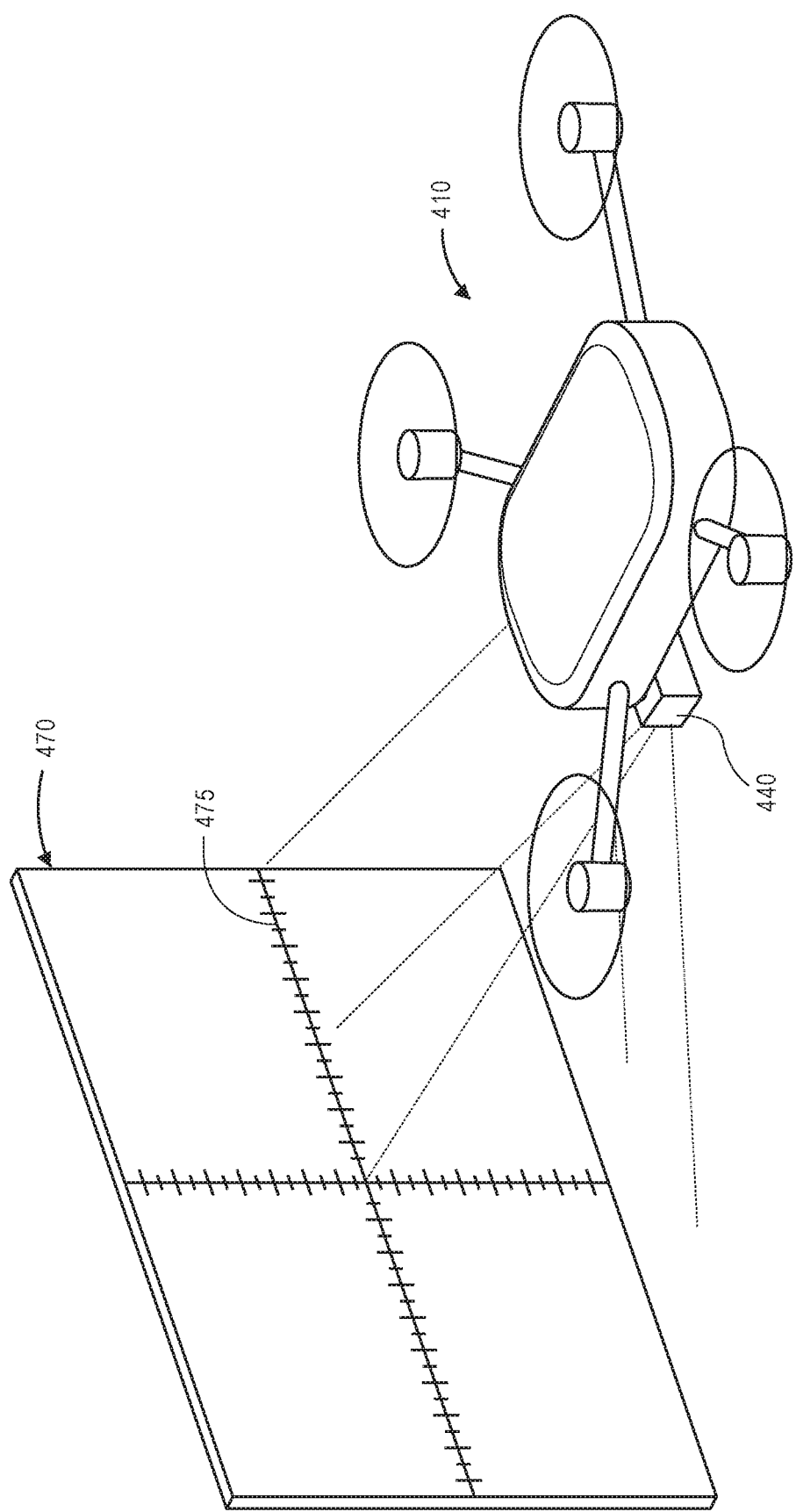

As is shown in FIGS. 4A and 4B, an unmanned aerial vehicle 410 includes a stereo rig 440 having a pair of imaging devices 442-1, 442-2 and a laser transmitter (or other light source) 445, which is located adjacent to the imaging device 442-2, and remote from the imaging device 442-1, within the stereo rig 440.

In accordance with embodiments of the present disclosure, the imaging devices 442-1, 442-2 may be calibrated for use in stereo ranging operations using the laser transmitter 445. As is shown in FIGS. 4A and 4B, the aerial vehicle 410 may be aligned with respect to a surface 470 including a reticle 475 (or crosshairs or another set of markings), such that the surface 470 is within fields of view of the imaging devices 442-1, 442-2. The laser transmitter 445 is aligned to project light into the fields of view of the imaging devices 442-1, 442-2, and onto the surface 470, which may be any structure that is aligned normal to the fields of view of the imaging devices 442-1, 442-2 and the orientation of the laser transmitter 445.

Figure 4C:
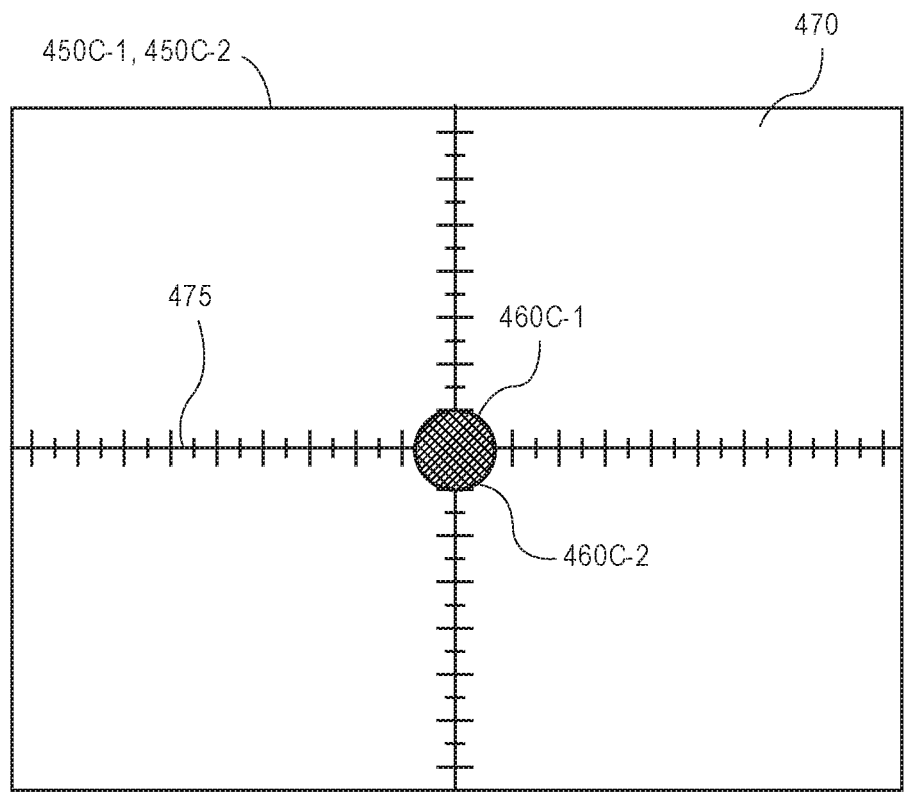

The appearance of reflections of the light projected onto the surface 470 within imaging data captured by the respective imaging devices 442-1, 442-2 may be used to calibrate the imaging devices 442-1, 442-2 for stereo ranging operations. As is shown in FIG. 4C, the imaging devices 442-1, 442-2 may be configured to detect patterns of reflected light within each of the images 450C-1, 450C-2. For example, the patterns of the reflected light are depicted consistently within the images 450C-1, 450C-2, in that the patterns are dots 460C-1, 460C-2 that have substantially the same size and are depicted in substantially the same location in each of the images 450C-1, 450C-2. The patterns of light may act as a baseline, zero-vibration representation of the status of the imaging devices 442-1, 442-2 with respect to one another, e.g., with propulsion motors and other vibration-inducing components of the aerial vehicle 410 stopped. To the extent that such patterns were not depicted consistently within the images 450C-1, 450C-2, maintenance, repairs or other evolutions may be performed on one or both of the imaging devices 442-1, 442-2 until the patterns appear consistently within images subsequently captured by the imaging devices 442-1, 442-2, thereby resulting in a baseline, zero-vibration status.

Figure 4D:
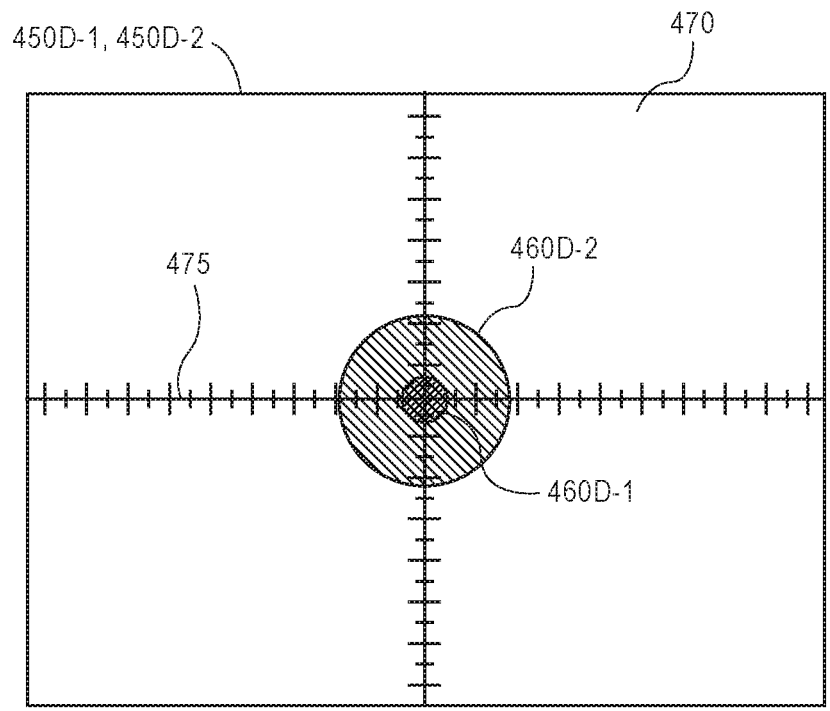

During operation of propulsion motors or other vibration-inducing components of the aerial vehicle 410, patterns of reflected light detected within images captured using the imaging devices 442-1, 442-2 may be evaluated to determine whether one or both of the imaging devices 442-1, 442-2 requires calibration or other forms of maintenance or repair. As is shown in FIG. 4D, patterns in the form of dots 460D-1, 460D-2 detected within images 450D-1, 450D-2, captured by the respective imaging devices 442-1, 442-2 are shown. Sizes of the dots 460D-1, 460D-2 may be measured based on the reticle 475 and compared to one another. Where one of the dots 460D-1, 460D-2, viz., the dot 460D-2, is determined to be larger than another of the dots 460D-1, 460D-2, viz., the dot 460D-1, one or both of the imaging devices 442-1, 442-2 may be determined to be out-of-focus and may require focusing or other forms of adjustment.

Figure 4E:
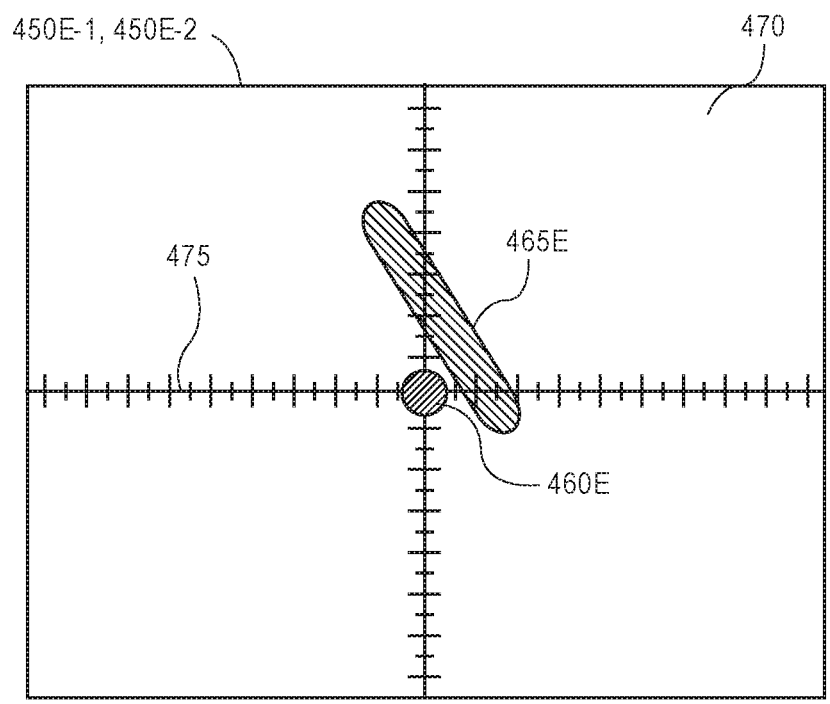

As is shown in FIG. 4E, patterns of reflected light in the form of a dot 460E and a line segment 465E detected within images 450E-1, 450E-2, captured by the respective imaging devices 442-1, 442-2 are shown. Where the patterns of the reflected light appear as the dot 460E within the image 450E-1 and as the line segment 465E within image 450E-2, relative motion or vibration is present between one or both of the imaging devices 442-1, 442-2, and the stereo rig 440 or one or more of the imaging devices 442-1, 442-2 may require adjustment.

Figure 5A:
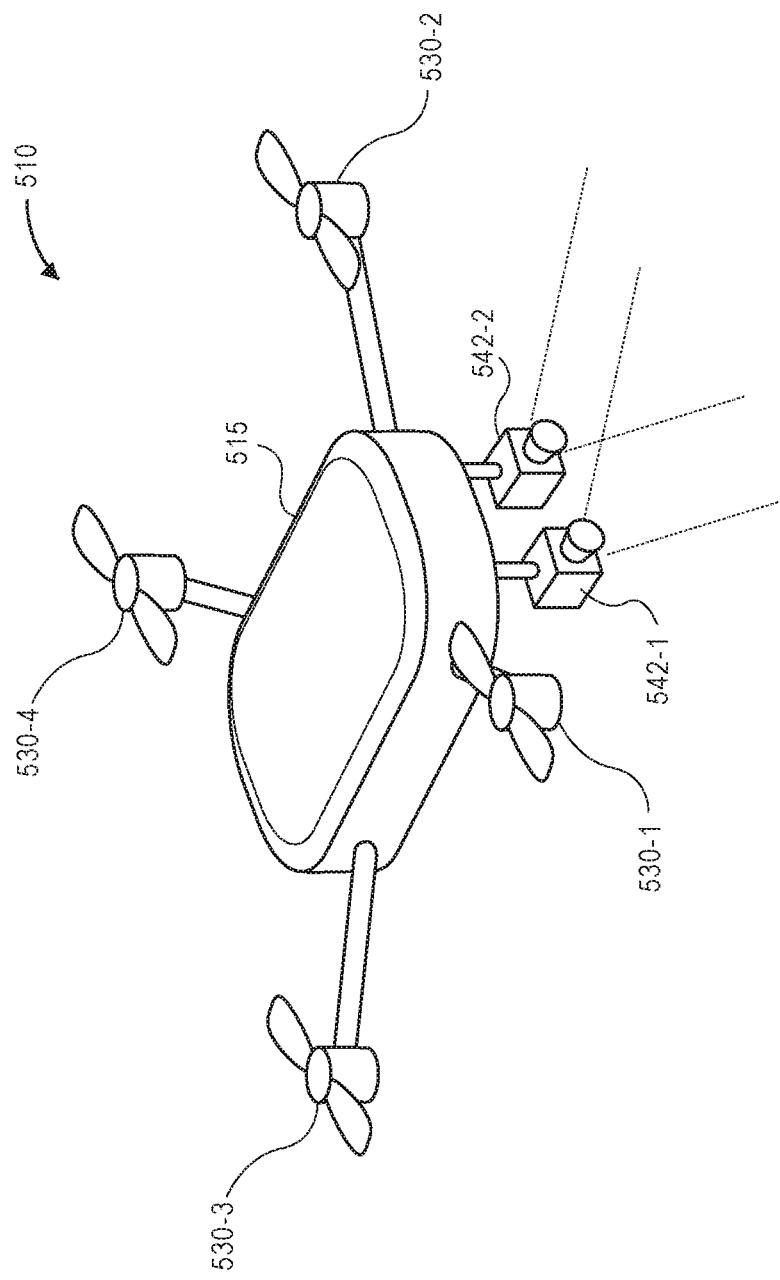
FIGS. 5A, 5B and 5C are views of aspects of one system for calibrating or detecting vibration in stereo ranging systems in accordance with embodiments of the present disclosure.
Figure 5B:
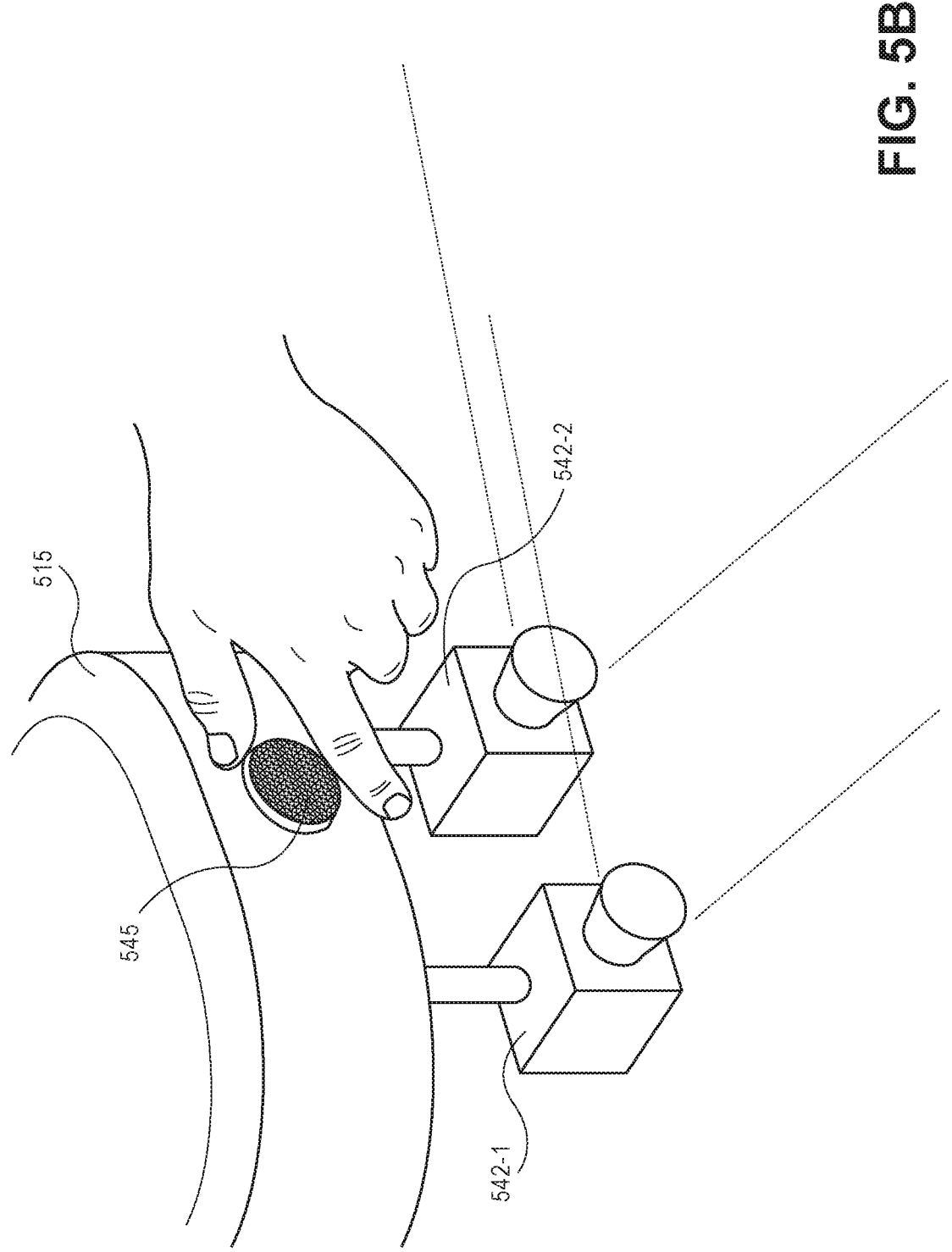
Figure 5C:
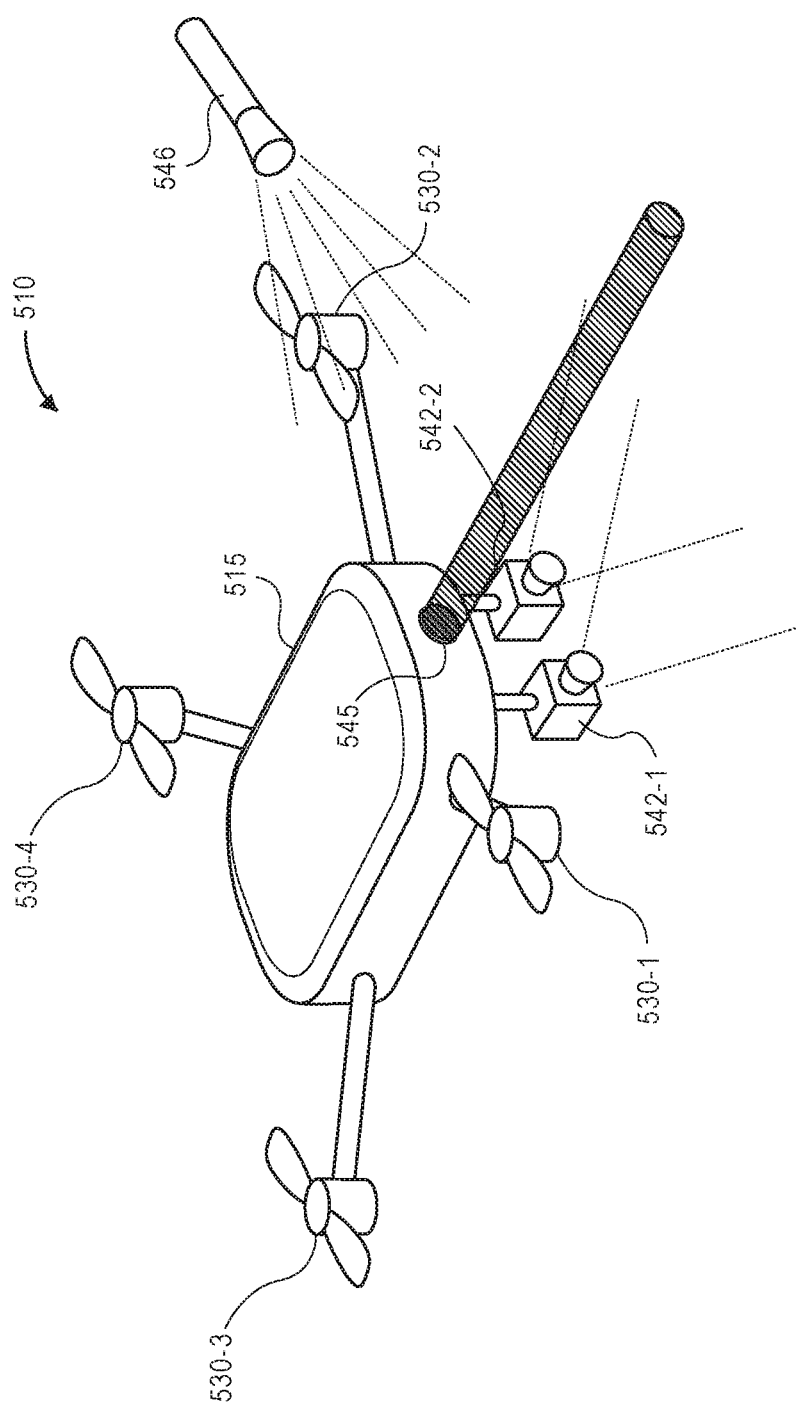

As is discussed above, one or more reflective surfaces or objects may be applied to a stereo rig or other system having imaging devices aligned in a pair. Light projected upon the reflective surfaces or objects may be projected into the fields of view of the imaging devices and used to calibrate the imaging devices. Referring to FIGS. 5A through 5C, views of aspects of one system for calibrating or detecting vibration in stereo ranging systems in accordance with embodiments of the present disclosure are shown. Except where otherwise noted, reference numerals preceded by the number "5" shown in FIG. 5A, FIG. 5B or FIG. 5C indicate components or features that are similar to components or features having reference numerals preceded by the number "4" shown in FIGS. 4A through 4E, by the number "2" shown in FIG. 2 or by the number "1" shown in FIGS. 1A through 1D.

As is shown in FIG. 5A, an aerial vehicle 510 includes a frame 515, a plurality of motors 530-1, 530-2, 530-3, 530-4 mounted to the frame 515 and a pair of imaging devices 542-1, 542-2 mounted to the frame 515. As is shown in FIG. 5A, the imaging devices 542-1, 542-2 are aligned with axes or orientation or fields of view extending forward of the aerial vehicle 510.

As is shown in FIG. 5B, a reflective label (or object) 545 is applied to a surface of the frame 515, within a vicinity of the imaging devices 542-1, 542-2, above and subsequently equidistant to each of the imaging devices 542-1, 542-2. Alternatively, in some embodiments, the reflective label 545 may be applied in close proximity to one of the imaging device 542-1, 542-2, and remote from another of the imaging devices 542-1, 542-2, in order to more closely mimic vibration, shocks or other motion affecting the one of the imaging devices 542-1, 542-2 nearest the reflective label 545, in a manner similar to the placement of the laser transmitter 145 shown in FIGS. 1A and 1B. Alternatively, in some other embodiments, the imaging devices 542-1, 542-2 may be mounted or provided within a stereo rig (or "3D rig") mounted to the aerial vehicle 510, and the reflective label 545 may be applied to the stereo rig.

As is shown in FIG. 5C, in order to project light into the fields of view of the imaging devices 542-1, 542-2, light may be projected upon the reflective label 545 by an external light source 546. Reflections of the light from the reflective label 545 may be detected within images captured by the imaging devices 542-1, 542-2. Where the reflections of light appear consistently within the respective images, the imaging devices 542-1, 542-2 and/or a stereo rig to which the imaging devices 542-1, 542-2 are coupled need not require maintenance or adjustment. Where the reflections of light do not appear consistently within the respective images, such as where one of the imaging devices 542-1, 542-2 is out-of-focus or the stereo rig or the imaging devices 542-1, 542-2 has been subject to vibration, shocks or other motion, maintenance or adjustment may be required.

Figure 6:
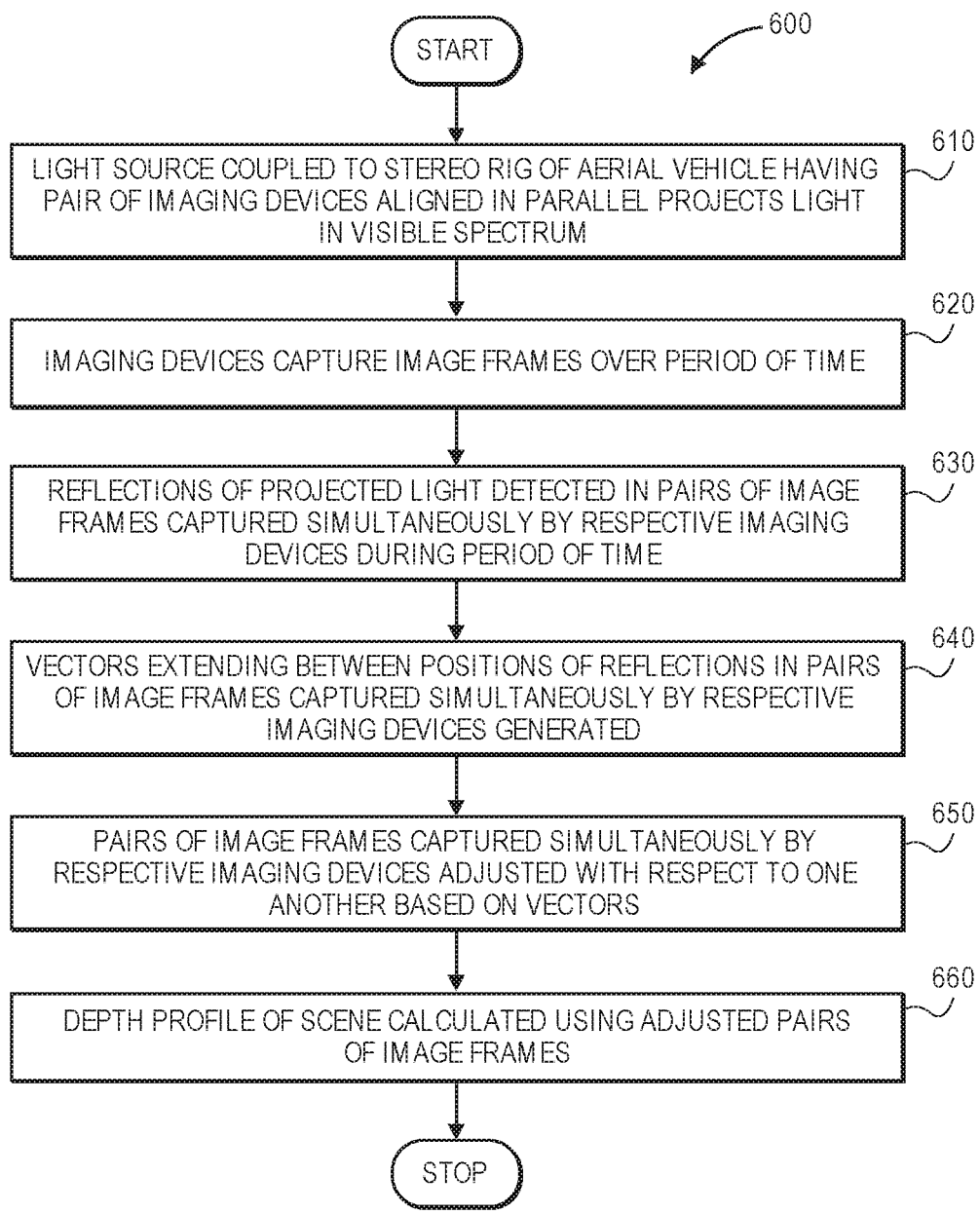
FIG. 6 is a flow chart of one process for calibrating or detecting vibration in stereo ranging systems in accordance with embodiments of the present disclosure.

As is discussed above, where vibrations are detected within imaging data captured by imaging devices of a stereo ranging system, a vector representative of the relative motion or vibration between the imaging devices may be generated, and imaging data captured by one or both of the images may be modified or adjusted based on such vectors. Referring to FIG. 6, a flow chart 600 of one process for calibrating or detecting vibration in stereo ranging systems in accordance with embodiments of the present disclosure is shown.

At box 610, a light source coupled to a stereo rig of an aerial vehicle having a pair of imaging devices aligned in parallel projects light in a visible spectrum. The light source may be integrated into the stereo rig, e.g., as a component part of the stereo rig, or temporarily or releasably affixed to one or more surfaces or other aspects of the stereo rig. For example, the light source may be a light-emitting diode or laser diode integrated with the stereo rig, or a reflective object that is applied to the stereo rig and configured to reflect light projected thereon upon one or more surfaces. In some embodiments, the light source may be coupled in close proximity to one of the imaging devices of the stereo rig, and at a maximum distance from another of the imaging devices of the stereo rig, to thereby ensure that the light source closely mimics vibrations, shocks or other motion affecting the one of the imaging devices to which the light source is nearest. In some other embodiments, however, the light source may be mounted at any location with respect to one or both of the imaging devices of the stereo rig.

At box 620, the imaging devices capture images over a period of time. For example, in an operational setting, the imaging devices may be configured to capture individual images, or streams of images, as the aerial vehicle is engaged in flight operations, e.g., forward flight, vertical flight or hovering operations, with one or more propulsion motors or other vibration-generating systems operating. In a maintenance or laboratory setting, e.g., where the imaging device is to be calibrated or subject to one or more maintenance evolutions or inspections, the imaging devices may be configured to capture individual images, or streams of images, with one or more propulsion motors or other vibration-generating systems operating or secured.

At box 630, reflections of the projected light are detected in pairs of the images that were captured simultaneously by the respective imaging devices during the period of time. For example, referring again to FIGS. 1C and 1D, because the light projected by the light source is within the visible spectrum, reflections of the light from one or more surfaces within the fields of view of the imaging devices may be depicted within the images. At box 640, vectors extending between the positions of the reflections in the pairs of the images that were captured simultaneously by the respective imaging devices are generated. For example, the vectors may be generated based on differences in position between pixels corresponding to the reflections represented in one of the images, pixels corresponding to the reflections represented in another of the images, e.g., differences in coordinates of such pixels in vertical and/or horizontal directions within planes of such images.

At box 650, pairs of the images captured simultaneously by the respective imaging devices are adjusted with respect to one another based on the vectors. For example, each of the pixels of one of the images may be adjusted with respect to each of the pixels of the other of the images based on the vectors generated at box 640.

At box 660, a depth profile of the scene is calculated using the adjusted pairs of the images, and the process ends. For example, depth or range data to objects may be determined based on disparities within the images, as well as a baseline distance or separation of the imaging devices, and focal lengths of the imaging devices, according to one or more stereo algorithms and/or techniques. As is noted above, disparities are defined as the separation of a given point between two images of the same scene, while a baseline distance or separation is a distance between positions of the imaging devices, and a focal length of an imaging device is a distance between a sensor and a lens within one of the imaging devices. Stereo ranging algorithms or techniques may use the disparity, the baseline distance or separation and the focal length in order to determine depths or ranges to objects, or depths or ranges to one or more aspects of such objects. The depth profile may be stored in one or more data stores, and utilized for any purpose, e.g., for navigation, guidance, collision avoidance, or any other purpose.

Referring to FIGS. 7A through 7E, views of aspects of one system for calibrating or detecting vibration in stereo ranging systems in accordance with embodiments of the present disclosure are shown. Except where otherwise noted, reference numerals preceded by the number "7" shown in FIG. 7A through 7E indicate components or features that are similar to components or features having reference numerals preceded by the number "5" shown in FIG. 5A, FIG. 5B or FIG. 5C, by the number "4" shown in FIGS. 4A through 4E, by the number "2" shown in FIG. 2 or by the number "1" shown in FIGS. 1A through 1D.

Figure 7A:
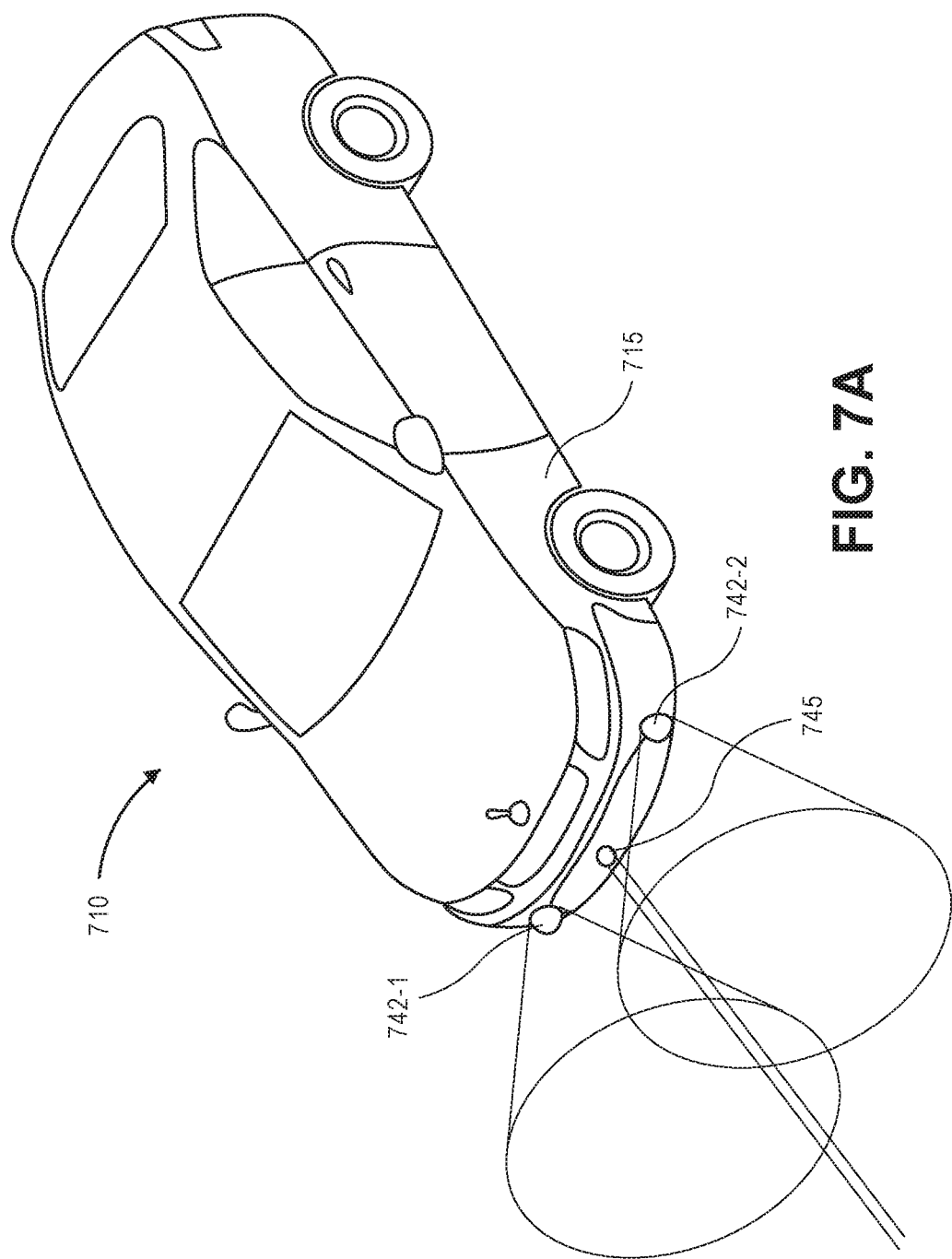

As is shown in FIG. 7A, a vehicle 710 is outfitted with a pair of imaging devices 742-1, 742-2 and a light source 745 (e.g., a light-emitting diode, a laser diode or other projecting light source, or a reflector that can project light in a modulated signal or other form onto one or more surfaces, in a well-defined pattern that is easily detectable). The imaging devices 742-1, 742-2 are aligned with fields of view extending forward of the vehicle 710, and the light source 745 is aligned to project light into the respective fields of view, forward of the vehicle 710. Alternatively, the vehicle 710 may be outfitted with any number of imaging devices, which may be aligned in any orientation with respect to the vehicle 710, e.g., aft, above or below, or to port or starboard sides, and with any number of light sources or other illuminators configured to project light into their respective fields of view.

Figure 7B:
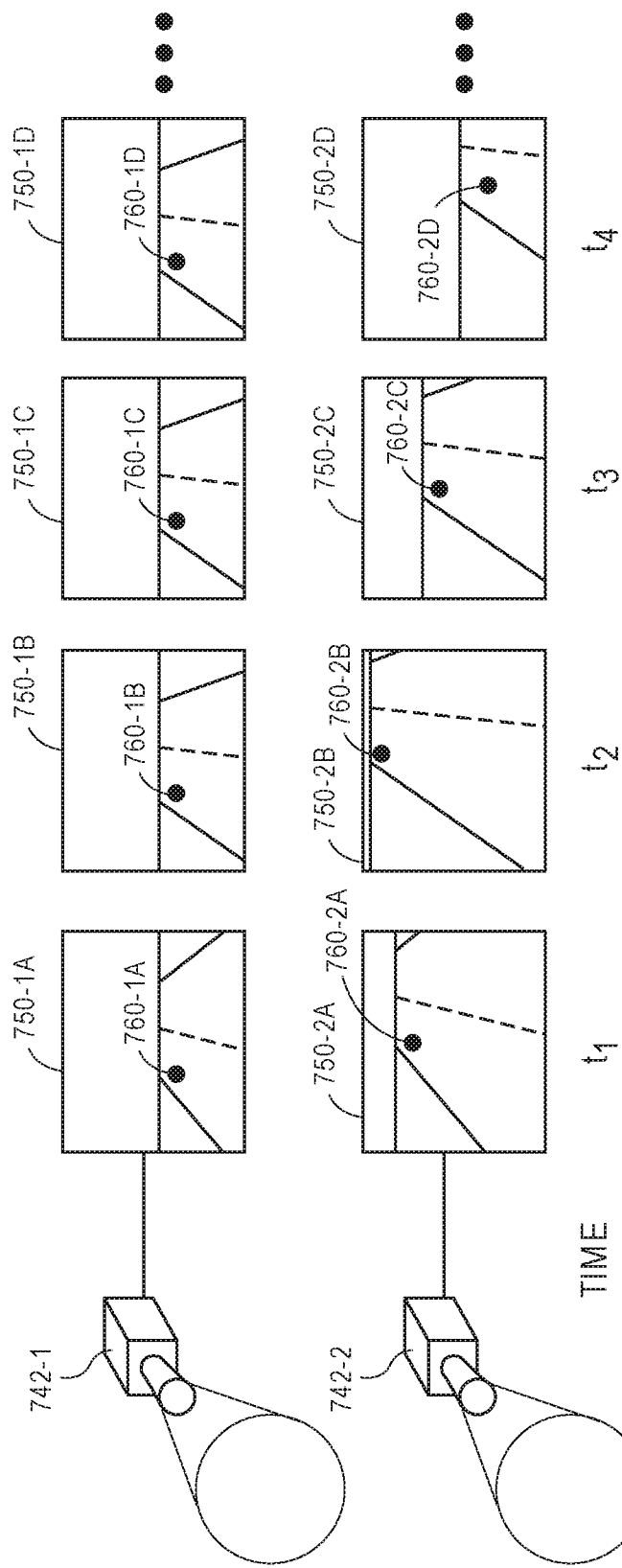

As is shown in FIG. 7B, a plurality of images 750-1A, 750-1B, 750-1C, 750-1D are captured by the imaging device 742-1 in series at times $t_1$, $t_2$, $t_3$, $t_4$. A plurality of images 750-2A, 750-2B, 750-2C, 750-2D are also captured by the imaging device 742-2 in series at the times $t_1$, $t_2$, $t_3$, $t_4$. Reflections of light projected into the fields of view of the imaging devices 742-1, 742-2 by the light source 745 from objects forward of the vehicle 710 are depicted within the images 750-1A, 750-1B, 750-1C, 750-1D, 750-2A, 750-2B, 750-2C, 750-2D, including reflections 760-1A, 760-1B, 760-1C, 760-1D within the images 750-1A, 750-1B, 750-1C, 750-1D and reflections 760-2A, 760-2B, 760-2C, 760-2D within the images 750-2A, 750-2B, 750-2C, 750-2D.

Figure 7C:
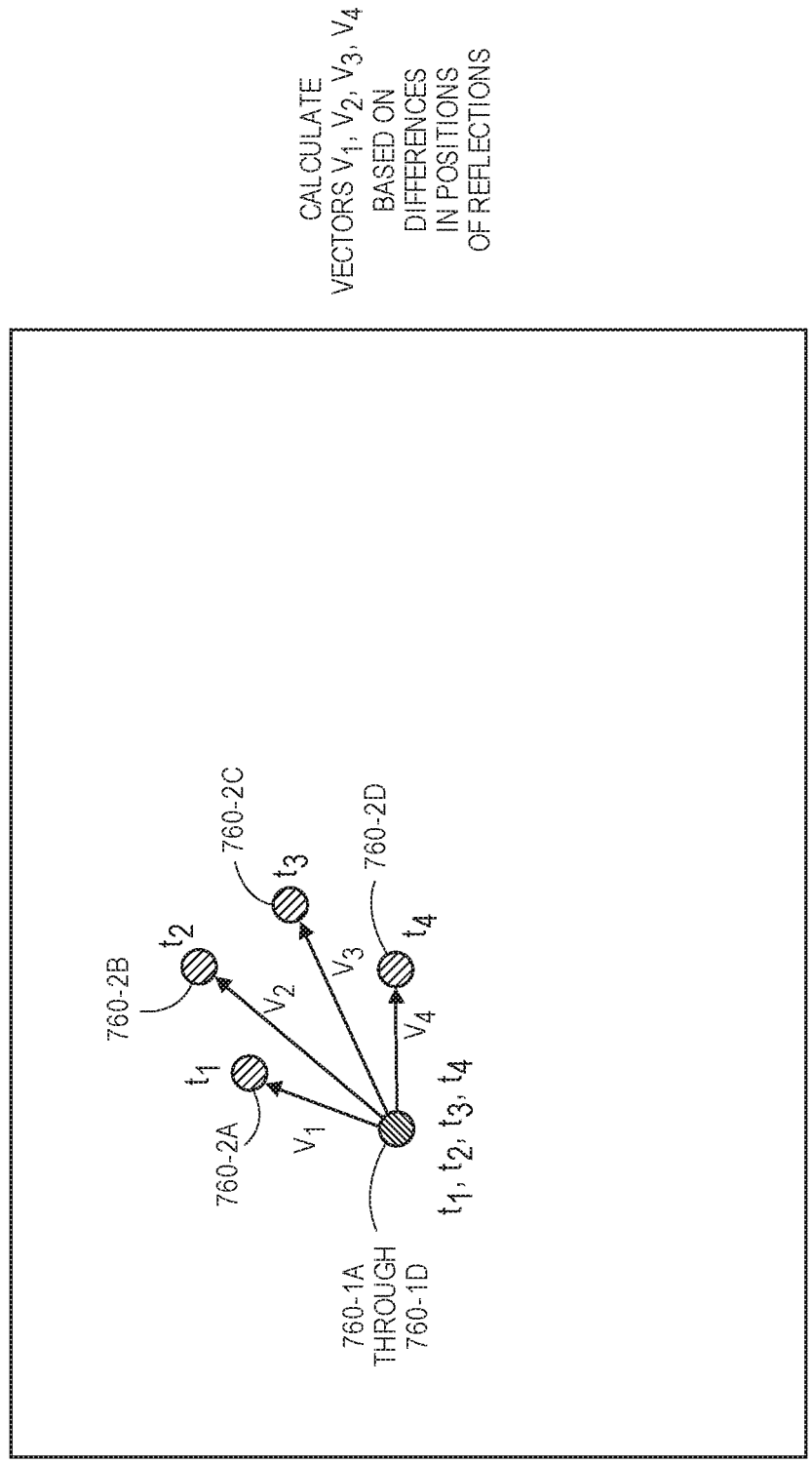

As is shown in FIG. 7C, vectors may be calculated between the positions of the reflections within the images that were captured simultaneously using the imaging devices 742-1, 742-2. For example, as is shown in FIG. 7C, a vector $v_1$ represents a difference between the position of the reflection 760-1A in the image 750-1A captured by the imaging device 742-1 at time $t_1$ and the position of the reflection 760-2A in the image 750-2A that was also captured by the imaging device 742-2 at time $t_1$. Likewise, vectors $v_2$, $v_3$, $v_4$ represent differences between the positions of the reflections 760-1B, 760-1C, 760-1D in the images 750-1B, 750-1C, 750-1D captured by the imaging device 742-1 at times $t_2$, $t_3$, $t_4$ and the positions of the reflections 760-2B, 760-2C, 760-2D in the images 750-2B, 750-2C, 750-2D that were also captured by the imaging device 742-2 at the times $t_2$, $t_3$, $t_4$.

Figure 7D:
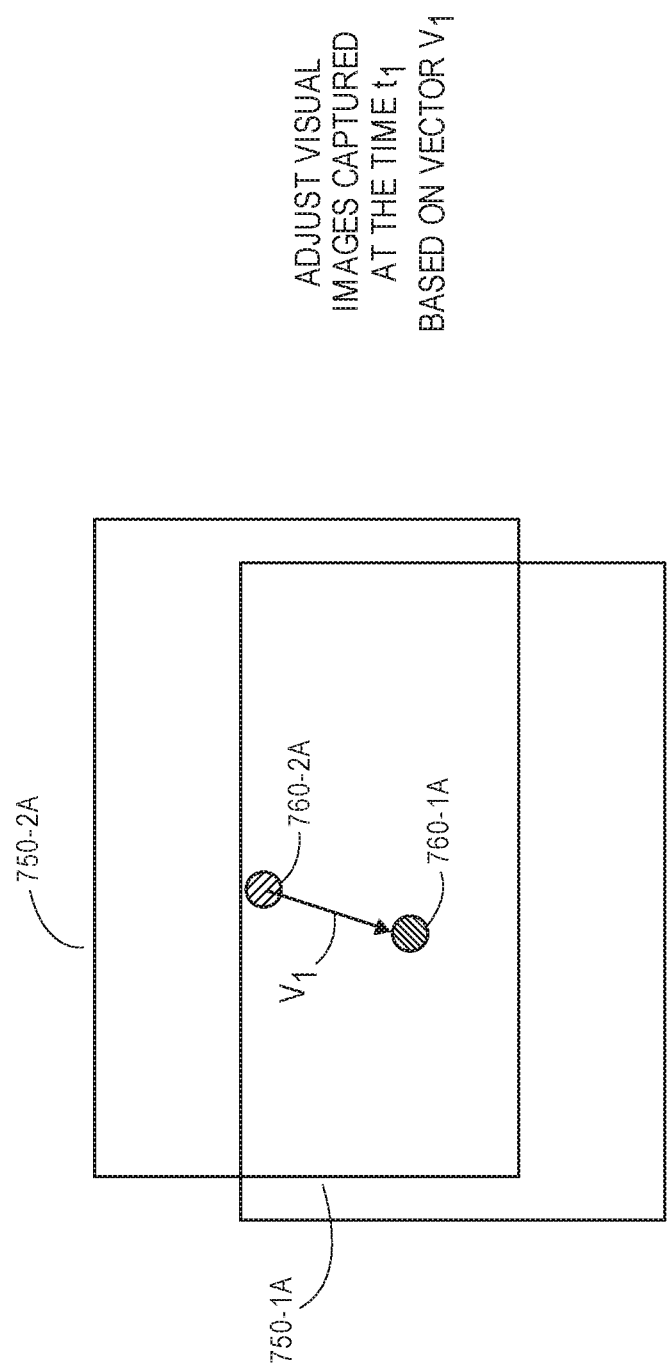

The vectors $v_1$, $v_2$, $v_3$, $v_4$ generated based on the differences in the positions of the reflections may be used to adjust one or both of the images captured at the same time using the imaging devices 742-1, 742-2. For example, as is shown in FIG. 7D, the image 750-2A captured at the time $t_1$ may be adjusted with respect to the image 750-1A based on the vector $v_1$, or vice versa, such that the reflections appear similarly within the respective images 750-1A, 750-2A. The images 750-2B, 750-2C, 750-2D captured at the times $t_2$, $t_3$, $t_4$ may be adjusted with respect to the images 750-1B, 750-1C, 750-1D based on the vectors $v_2$, $v_3$, $v_4$, or vice versa, such that the reflections appear similarly within the respective images 750-1B, 750-2B, 750-1C, 750-2C, 750-1D, 750-2D, in a similar manner.

As is shown in FIG. 7E, once the images 750-1A, 750-2A, 750-1B, 750-2B, 750-1C, 750-2C, 750-1D, 750-2D are adjusted with respect to one another, the images 750-1A, 750-2A, 750-1B, 750-2B, 750-1C, 750-2C, 750-1D, 750-2D may be used to calculate depth profiles of the scene at times $t_1$, $t_2$, $t_3$, $t_4$.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Although some of the embodiments disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of vehicle, and for any intended industrial, commercial, recreational or other use.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3 or 6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
    a stereo rig comprising:
        a housing;
        a first digital camera disposed within the housing, wherein the first digital camera has a first field of view extending forward of the unmanned aerial vehicle; and
        a second digital camera disposed within the housing, wherein the second digital camera has a second field of view extending forward of the unmanned aerial vehicle, and wherein the second field of view overlaps with the first field of view at least in part;
    a light source aligned to project light into the first field of view and the second field of view; and
    at least one computer processor in communication with each of the first digital camera and the second digital camera,
    wherein the at least one computer processor is configured to at least:
        cause the first digital camera to capture a first image at a first time, wherein at least a first beam of visible light is projected by the light source into the first field of view at the first time;
        cause the second digital camera to capture a second digital image at the first time, wherein the first beam of visible light is projected by the light source into the second field of view at the first time;
        detect a first reflection of the first beam of visible light depicted in the first image;
        detect a second reflection of the first beam of visible light depicted in the second image; and
        determine that the first reflection of the first beam of visible light depicted in the first image is consistent with the second reflection of the first beam of visible light depicted in the second image.

2. The unmanned aerial vehicle of claim 1, further comprising at least one propulsion motor coupled to at least one propeller,
    wherein the at least one propulsion motor is in communication with the at least one computer processor, and
    wherein the at least one computer processor is further configured to at least:
        cause the at least one propulsion motor to rotate the at least one propeller at a selected speed at a second time, wherein the second time follows the first time, and wherein the at least one propulsion motor is not rotating the at least one propeller at the first time;
        cause the first digital camera to capture a third image at a third time, wherein at least a second beam of visible light is projected by the light source into the first field of view at the third time, and wherein the third time follows the second time;
        cause the second digital camera to capture a fourth image at the third time, wherein the second beam of visible light is projected by the light source into the second field of view at the third time;
        detect a third reflection of the second beam of visible light depicted in the third image;
        detect a fourth reflection of the second beam of visible light depicted in the fourth image; and
        determine that the third reflection of the second beam of visible light depicted in the third image is inconsistent with the fourth reflection of the second beam of visible light depicted in the fourth image; and
        in response to determining that the third reflection of the second beam of visible light depicted in the third image is inconsistent with the fourth reflection of the second beam of visible light depicted in the fourth image,
            perform maintenance on at least one of the first digital camera or the second digital camera.

3. The unmanned aerial vehicle of claim 1, wherein a first distance between the first imaging device and the light source is greater than a second distance between the second imaging device and the light source.

4. The unmanned aerial vehicle of claim 1, wherein the light source comprises:
- a light-emitting diode embedded within the housing;
- a laser diode embedded within the housing; or
- a reflective object coupled to the housing.

5. A method comprising:
- causing at least a first beam of light to be projected onto at least one surface within a first field of view of a first imaging device and a second field of view of a second imaging device at a first time, wherein the first field of view overlaps with the second field of view at least in part, and wherein each of the first imaging device and the second imaging device is a part of a stereo ranging system;
- capturing at least a first image by the first imaging device at the first time;
- capturing at least a second image by the second imaging device at the first time;
- detecting a first reflection of the first beam of light from the at least one surface within the first image;
- detecting a second reflection of the first beam of light from the at least one surface within the second image;
- generating a first comparison of the first reflection to the second reflection by at least one processor, wherein the first comparison comprises generating a vector extending from at least one pixel of the first image corresponding to the first reflection and at least one pixel of the second image corresponding to the second reflection;
- adjusting the first image with respect to the second image based at least in part on the vector; and
- determining that the stereo ranging system is calibrated based at least in part on the first comparison.

6. The method of claim 5, further comprising:
- generating a depth profile of a scene based at least in part on the adjusted first image and the second image.

7. A method comprising:
- causing at least a first beam of light to be projected onto at least one surface within a first field of view of a first imaging device and a second field of view of a second imaging device at a first time, wherein the first field of view overlaps with the second field of view at least in part, and wherein each of the first imaging device and the second imaging device is a part of a stereo ranging system;
- capturing at least a first image by the first imaging device at the first time;
- capturing at least a second image by the second imaging device at the first time;
- detecting a first reflection of the first beam of light from the at least one surface within the first image;
- detecting a second reflection of the first beam of light from the at least one surface within the second image;
- determining a first size of the first reflection within the first image;
- determining a second size of the second reflection within the second image;
- generating a first comparison of the first reflection to the second reflection by at least one processor, wherein the first comparison is a comparison of the first size to the second size; and
- determining that the stereo ranging system is calibrated based at least in part on the first comparison, wherein determining that the stereo ranging system is calibrated based at least in part on the first comparison comprises:
  - determining that the first size is substantially equal to the second size.

8. The method of claim 7, wherein each of the first imaging device, the second imaging device and the light source is provided in association with at least one surface of a vehicle.

9. The method of claim 7, wherein the light source comprises one of a light-emitting diode, a laser diode or a reflective object.

10. The method of claim 7, wherein the at least one surface is marked with a reticle,
- wherein the first size is determined based at least in part on the first reflection and a depiction of the reticle in the first image, and
- wherein the second size is determined based at least in part on the second reflection and a depiction of the reticle in the second image.

11. A method comprising:
- causing at least a first beam of light to be projected onto at least one surface within a first field of view of a first imaging device and a second field of view of a second imaging device at a first time, wherein the first field of view overlaps with the second field of view at least in part, and wherein each of the first imaging device and the second imaging device is a part of a stereo ranging system;
- capturing at least a first image by the first imaging device at the first time;
- capturing at least a second image by the second imaging device at the first time;
- detecting a first reflection of the first beam of light from the at least one surface within the first image, wherein detecting the first reflection of the first beam of light from the at least one surface within the first image comprises:
  - generating a first pattern corresponding to the first reflection;
- detecting a second reflection of the first beam of light from the at least one surface within the second image, wherein detecting the second reflection of the first beam of light from the at least one surface within the second image comprises:
  - generating a second pattern corresponding to the second reflection;
- generating a first comparison of the first reflection to the second reflection by at least one processor, wherein the first comparison is a comparison of the first pattern to the second pattern; and
- determining that the stereo ranging system is calibrated based at least in part on the first comparison, wherein determining that the stereo ranging system is calibrated based at least in part on the comparison comprises:
  - determining that the first pattern is substantially similar to the second pattern.

12. A method comprising:
- causing at least a first beam of light to be projected onto at least one surface within a first field of view of a first imaging device and a second field of view of a second imaging device at a first time, wherein the first field of view overlaps with the second field of view at least in part, and wherein each of the first imaging device and the second imaging device is a part of a stereo ranging system;
- capturing at least a first image by the first imaging device at the first time;
- capturing at least a second image by the second imaging device at the first time;

detecting a first reflection of the first beam of light from the at least one surface within the first image;

detecting a second reflection of the first beam of light from the at least one surface within the second image;

generating a first comparison of the first reflection to the second reflection by at least one processor;

causing at least a second beam of light to be projected onto the at least one surface at a second time, wherein the second time is prior to the first time;

capturing at least a third image by the first imaging device at the second time;

capturing at least a fourth image by the second imaging device at the second time;

detecting a third reflection of the second beam of light from the at least one surface within the third image;

detecting a fourth reflection of the second beam of light from the at least one surface within the fourth image;

generating a second comparison of the third reflection to the fourth reflection by the at least one processor, determining that the first reflection is inconsistent with the second reflection based at least in part on the second comparison; and in response to determining that the first reflection is inconsistent with the second reflection based at least in part on the second comparison, performing maintenance on at least one of the first imaging device or the second imaging device at a third time, wherein the third time follows the second time and precedes the first time.

13. The method of claim 5, wherein the first imaging device and the second imaging device are embedded within a stereo rig.

14. The method of claim 13, wherein at least a portion of the light source is embedded within at least one surface of the stereo rig.

15. The method of claim 5, wherein the light source comprises one of a light-emitting diode, a laser diode or a reflective object.

16. The method of claim 5, wherein the light source comprises a reflective object aligned to reflect light into the first field of view and the second field of view, and wherein causing at least the first beam of light to be projected onto the at least one surface within the first field of view of the first imaging device and the second field of view of the second imaging device at the first time comprises:

causing at least a second beam of light to be projected onto the reflective object at or prior to the first time.

17. A stereo rig comprising:

a housing;

a first imaging device mounted within a surface of the housing, wherein the first imaging device has a first field of view;

a second imaging device mounted within the surface of the housing, wherein the second imaging device has a second field of view, and wherein the first field of view overlaps with the second field of view at least in part; and a light source mounted in association with the surface of housing, wherein the light source is configured to project light normal to the surface of the housing into the first field of view and the second field of view, wherein each of the first imaging device, the second imaging device and the light source is coupled to a computer device configured to execute a method comprising:

causing the light source to project at least a first beam of light into the first field of view and the second field of view at a first time;

capturing at least a first image by the first imaging device at the first time;

capturing at least a second image by the second imaging device at the first time;

detecting a first reflection of the first beam of light from the at least one surface within the first image;

detecting a second reflection of the first beam of light from the at least one surface within the second image;

generating a comparison of the first reflection to the second reflection; and determining that at least one of the first imaging device or the second imaging device requires maintenance based at least in part on the comparison.

18. The stereo rig of claim 17, wherein the stereo rig is coupled to a vehicle.

19. The stereo rig of claim 17, wherein the light source comprises one of a laser diode or a light-emitting diode configured to project light in at least one direction, and wherein the at least one direction is normal to the surface of the housing into the first field of view and the second field of view.

20. The stereo rig of claim 17, wherein the light source comprises a reflective object releasably applied to the surface of the housing configured to reflect light in at least one direction, and wherein the at least one direction is normal to the surface of the housing into the first field of view and the second field of view.

* * * * *